United States Patent [19]

Powell et al.

[11] Patent Number: 4,849,036
[45] Date of Patent: Jul. 18, 1989

[54] COMPOSITE POLYMER-GLASS EDGE CLADDING FOR LASER DISKS

[75] Inventors: Howard T. Powell, Livermore; Michael O. Riley, San Ramon; Charles R. Wolfe, Palo Alto; Richard E. Lyon; John H. Campbell, both of Livermore; Edward S. Jessop, Tracy; James E. Murray, Livermore, all of Calif.

[73] Assignee: The United States of America as represented by the United States Department of Energy, Washington, D.C.

[21] Appl. No.: 116,806

[22] Filed: Nov. 2, 1987

[51] Int. Cl.$^4$ .................. B32B 31/12; B32B 17/06
[52] U.S. Cl. ............................ 156/99; 156/330; 372/40; 428/66; 428/192; 428/194; 428/415
[58] Field of Search .................. 156/99, 330; 372/40, 372/41; 428/192, 194, 415, 66

[56] References Cited

U.S. PATENT DOCUMENTS

| 3,335,372 | 8/1967 | Horning . |
| 3,675,157 | 7/1972 | Kaminow . |
| 4,217,382 | 8/1980 | Toratani ........................... 428/66 |
| 4,581,317 | 4/1986 | Simmons ........................... 430/270 |

OTHER PUBLICATIONS

Wolfe, Campbell, Lyon, Pitts & Powell, "Optical Damage in Epoxy Polymers by Millisecond Light Pulses," *Laser Induced Damage in Potical Materials,* Boulder Damage Symposium, Nov. 1986.
Murray et al., "Silicone Edge Claddings," 1983 *Laser Program Annual Report,* UCRL-50021-83, Jun. 1984, Sections 6-8.
J. E. Murray et al., "Silicon Rubber Edge Claddings for Laser Disk Amplifiers," CLEO '84, Conference on Lasers and Electro-Optics, Technical Digest, Jun. 19-22, 1984, Anaheim, Calif., No. THF2.
G. Dubé and N. L. Boling, "Liquid Cladding for Face-Pumped Nd:Glass Lasers," *Applied Optics,* vol. 13, No. 4, pp. 699-700, (Apr. 1974).
S. Guch, Jr., "Parasitic Suppression in Large Aperture Disk Lasers Employing Liquid Edge Claddings," *Applied Optics,* vol. 15, No. 6, pp. 1453-1457, (Jun. 1976).
D. Milam, "Platinum Particles in the Nd:Doped Disks of Phosphate Glass in the Nova Laser," *Lawrence Livermore National Laboratory,* Feb. 20, 1986.
J. B. Trenholme, "Fluorescence Amplification and Parasitic Oscillation Limitations in Disc Lasers," *Navel Research Laboratory,* Memorandum Report, 2480, Jul. 1972.
J. E. Swain et al., "Large-Aperture Glass Disk Laser System," *Journal of Applied Physics,* vol. 40, No. 10, pp. 3973-3977, (Sep. 1969).
J. M. McMahon et al., "A Glass-Disk-Laser Amplifier," *IEE J. Quantum Electron.,* QE-9, p. 992, (1973).

*Primary Examiner*—Robert A. Dawson
*Attorney, Agent, or Firm*—L. E. Carnahan; Roger S. Gaither; William R. Moser

[57] ABSTRACT

Large neodymium glass laser disks for disk amplifiers such as those used in the Nova laser require an edge cladding which absorbs at 1 micrometer. This cladding prevents edge reflections from causing parasitic oscillations which would otherwise deplete the gain. Nova now utilizes volume-absorbing monolithic-glass claddings which are fused at high temperature to the disks. These perform quite well but are expensive to produce. Absorbing glass strips are adhesively bonded to the edges of polygonal disks using a bonding agent whose index of refraction matches that of both the laser and absorbing glass. Optical finishing occurs after the strips are attached. Laser disks constructed with such claddings have shown identical gain performance to the previous Nova disks and have been tested for hundreds of shots without significant degradation.

45 Claims, 19 Drawing Sheets

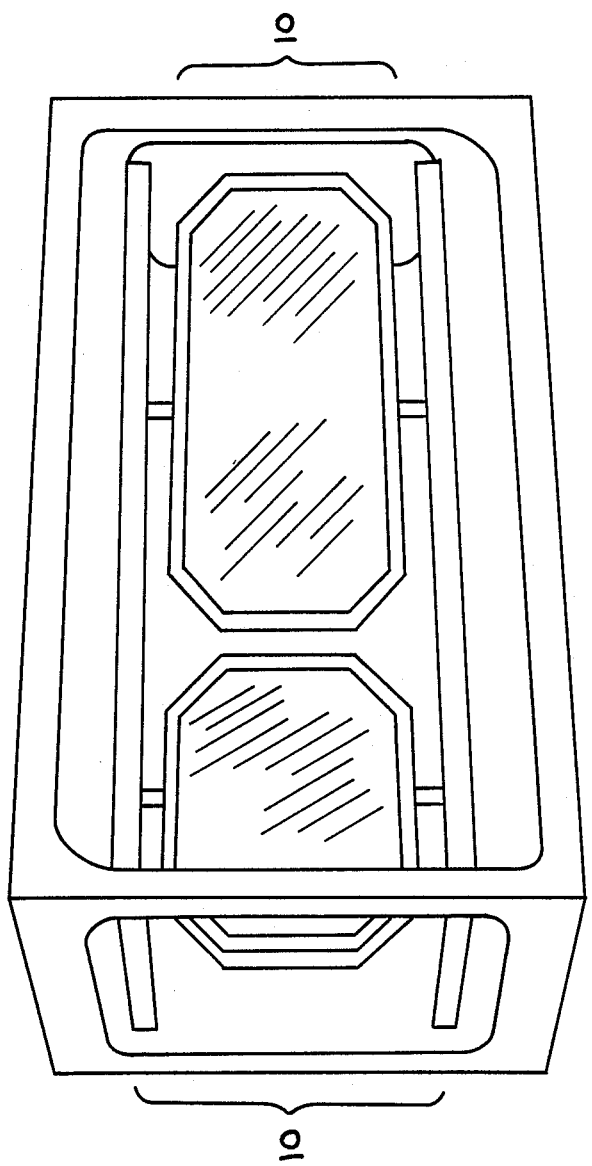

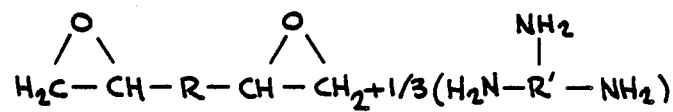
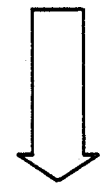
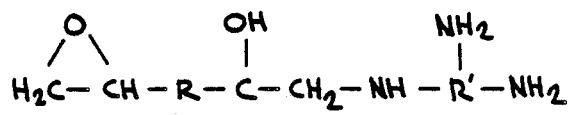
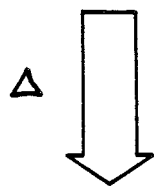
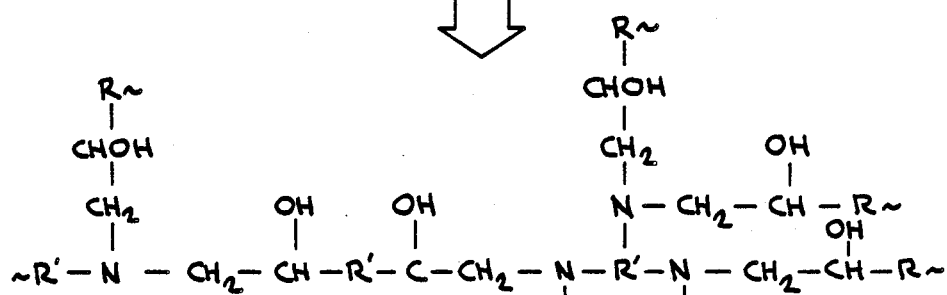
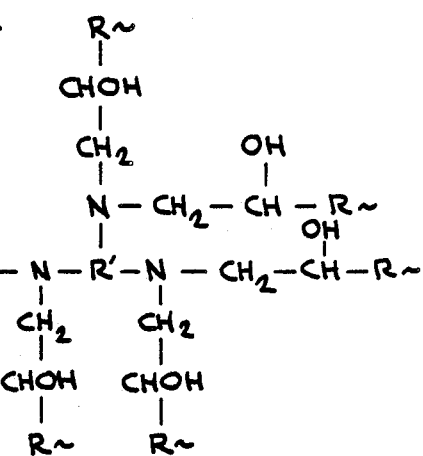
FIG. 9

VERTICAL  $\theta = 0.1$ TO $5°$

COMPOSITE POLYMER-GLASS EDGE CLADDING FOR LASER DISKS

Origin of the Invention

The invention described herein was performed by employees of the U.S. Department of Energy at the Lawrence Livermore National Laboratory under Contract No. W-7405-ENG-48. The U.S. Government has rights in this invention.

BACKGROUND OF THE INVENTION

1. Field of the Invention

The present invention relates to a method for reducing or eliminating parasitic oscillations [i.e. amplified spontaneous emissions (ASE)] in solid state laser materials. More specifically, it relates to an article comprised of a solid state laser gain material center which has bonded to its peripheral edge using a bonding agent a laser light absorbing material. All three components each have specific chemical and physical properties.

2. Description of Related Art

The architecture of most short-pulse, high-peak power neodymium (Nd) glass laser systems consists of a master oscillator followed by a series of power amplifiers. An example of one such system is the 100 kiloJoule (kJ) (pulsed) Nova laser at the Lawrence Livermore National Laboratory (LLNL), Livermore, Calif. In these laser systems the large power amplifiers contain disks of Nd-doped glass that are optically pumped by a series of xenon (Xe) flashlamps. If not properly designed, the stored energy density in laser glass disks decreases as the product of the disk size (D) and small-signal-gain coefficient ($\alpha$) (i.e. $\alpha \cdot D$) increases. This performance reduction is caused by the complementary effects of amplified spontaneous emission (ASE) and parasitic oscillations that can occur in the Nd:glass disks. (See, for example, "Fluorescence Amplification and Parasitic Oscillation Limitations in Disk Lasers", by J. B. Trenholme, NRL Memorandum Rep. 2480, July, 1972; J. E. Swain, et al., *J. Appl. Phys.*, 40, p. 3973 (1969); and J. M. McMahon et al., *IEEE J. Quantum Electron.* QE-9, p. 992 (1973)).

Edge claddings are used on laser disks to absorb the amplified spontaneous emission (ASE) and to suppress the onset of parasitic oscillations that would otherwise reduce the stored energy. In general, these claddings consist of a material that is refractive index matched to the laser glass and which contains a dopant that absorbs at the laser (ASE) frequency. A number of different materials have been used for cladding, ranging from sprayed-on glass frits to liquids to castings of monolithic glass. (See, for example, G. Dubé and N. L. Boling, in *Applied Optics*, Vol. 13, p. 699 (1974); S. Guch, Jr., in *Applied Optics*, Vol. 15, p. 1453 (1976); and D. Milam, C. W. Hatcher and J. H. Campbell, in "Platinum Particles in the Nd:doped Disks of Phosphate Glass in the Nova Laser", in *Laser Induced Damage in Optical Materials: 1985: Proceedings of the Boulder Damage Symposium,* Nov. 1985, Boulder, Colo.) In the 100-kJ Nova pulsed laser system, claddings of monolithic glass doped with ionic copper that absorbs at 1 micrometer have been used. Although the performance of this latter cladding is excellent, it is very expensive to apply. Further, it is known to induce some degree of residual stress near the disk edges that can potentially affect beam optical quality.

When the NOVA laser at LLNL was commissioned in 1985, it was found the phosphate laser glass contained a large number of microscopic Pt inclusions. These inclusions produced fractures within the glass of the power amplifiers when subjected to the high fluence Nova beam. Consequently, the glass was replaced with a newly developed Pt-inclusion-free glass.

In research reported by J. E. Murray et al., in "Silicone Rubber Edge Claddings for Laser Disk Amplifiers", in CLEO 84, Paper No. THF-2 (June, 1984), disk amplifiers were produced having edge claddings to prevent feedback of ASE. In particular, a room temperature-vulcanized (RTV) silicone rubber was poured about the peripheral edge of the laser disk and plates of filter glass were embedded in the rubber to absorb ASE. This silicone rubber-based edge cladding was successfully employed in a developmental amplifier, and it survived several thousand shots without degradation. As such it met most of the requirements of a low-cost, functional edge cladding which could be used on a large laser system. It was potentially cheap, because the materials were inexpensive, and it could be applied at room temperature. It performed well as an edge cladding, because the cured silicone rubber was water-clear, and its refractive index could be adjusted over the range 1.42 to 1.54, which included most laser glasses. Its major difficulty was that the cured rubber surface could not be cleaned adequately for the high energy laser environment. Dirt particles clung to the rubber surface, and the rubber itself was somewhat soft and crumbly so that it could not be wiped clean. Since components of a high energy laser system must be extremely clean to prevent damage from the laser beam, the silicone rubber itself prevented this cladding type from being used in high energy laser systems.

It is desirable to have a general low-cost method to clad the peripheral edge of glass laser disks with a laser light absorbing material capable of withstanding higher fluences and exhibiting higher moduli to and in grinding and finishing operations. The present invention provides such a method and article.

SUMMARY OF THE INVENTION

The present invention relates to a method for suppressing parasitic oscillations in a solid state laser component by producing an article having an integral solid state laser gain media which has bonded to its peripheral edge using an a bonding agent a laser light absorbing material, the method comprising;

(a) placing a thin layer of bonding agent chosen from the group consisting of polymers or polymerizable monomers, the bonding agent having a refractive index closely matching the solid state laser gain media, covering the entire outer surface of the peripheral edge of the solid state laser gain media, (b) using the organic material to bond a laser light absorbing material layer in close proximity and covering the entire outer surface of the peripheral edge of the solid state laser gain media, with the proviso that the bonding agent is not a silicone rubber (particularly not one having a thick bond line).

The invention further includes the following steps:

(c) optionally treating the surfaces to be bonded with acid to etch and clean the surface, and also step (d) optionally treating the surface to be bonded with a silane coupling agent.

In another aspect, the present invention relates to a method for suppressing parasitic oscillations in solid state laser gain media, the method comprising:

(a) mixing a dye or dispersing a pigment which absorbs light at a wavelength matching that of the light generated by the laser material in an organic material selected from the group consisting of organic polymers and polymerizable monomers, and (b) placing the organic material mixed with the dye or pigment on the peripheral edges of the solid state laser gain medium.

BRIEF DESCRIPTION OF THE DRAWINGS

FIG. 5 shows a front perspective view of the angled disks as they appear in the NOVA Laser.

FIG. 7 (b) shows the fluence of the flashlamp light reaching the disk surface is approximately 14 J/cm$^2$ but this is attenuated by nearly 20% upon passage through the disk.

FIG. 9 shows the reaction stoichiometry for amine-cured epoxies. Note that primary amines can undergo two epoxide reactions unless they become sterically hindered. Also in many epoxide systems the product alcohol group will further react with the epoxide particularly at elevated temperatures. This combination of reactions produces a highly cross-linked structure in epoxy polymers.

DETAILED DESCRIPTION OF THE INVENTION AND PREFERRED EMBODIMENTS

Definitions

As used herein:

"Bonding agent" refers to the materials which are useful to bond the laser media with the cladding (laser light absorbing material). Adhesive bonding agents which produce no volatile chemicals during curing and/or which shrink less that about 7% by volume are preferred. Bonding agents as adhesives include rigid silicones, epoxy-based adhesives, urethaneacrylates, poly (styrene) and the like. Epoxy-based adhesives are preferred.

"Integral solid state laser gain media" refers to material useful for the storage of optical energy. These materials include glass, ceramics, crystals, phosphate glass, fluorophosphate glass, silica glass or laminates of these materials. Phosphate glass is preferred. Nd doped (between about $10^{19}$ to $10^{21}$ ions per cubic centimeter) phosphate laser glass is more preferred. Phosphate glass which is Pt-inclusion free is available a number of sources. Preferably, it is phosphate glass LG-750 doped with neodymium from Schott American, Duryea, Pa. or LHG-8 glass from Hoya, Tokyo, Japan, having an office in Hayward, Calif. The cladding phosphate glass is available from Schott as LG-750 (doped with for example copper), or from Hoya as LGH-8 (doped with copper).

"Organic material" refers to a polymer used to clad or to surround a solid state laser gain media. Polymers when cured match the refractive index of the laser gain media within + or −0.003.

"Laser light absorbing material" refers to materials which closely match the refractive index of the solid state laser gain media. Preferred materials include glass, crystal, ceramics, phosphate glass, fluorophosphate glass or laminates of these materials. Phosphate glass is more preferred, especially when obtained doped with copper ions at a level sufficient to produce an absorption at 1.06 micrometer-wavelength of 0.45 mm$^{-1}$. This is often referred to as the "clad" or "cladding" material.

Figure 1:
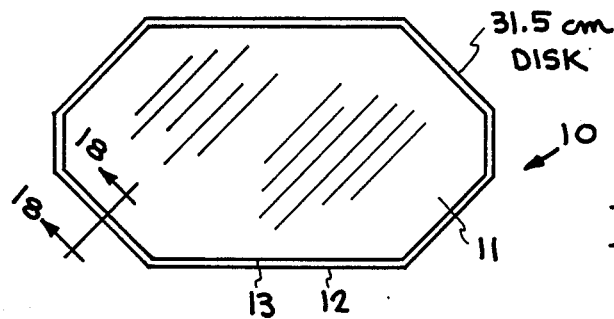
FIG. 1 shows a front view of an adhesive bonded glass clad laser glass disk having an edge cross-sectional segment.
Figure 1B:
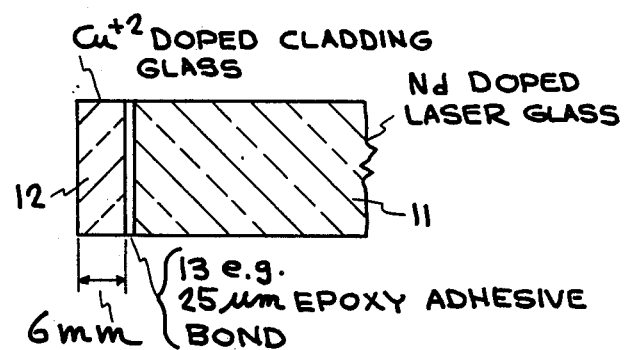
FIG. 1B shows an enlarged cross-section of the edge of the laser disk, adhesive and glass cladding.
Figure 2:
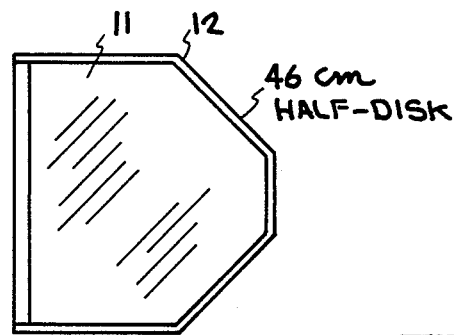
FIG. 2 shows the front view of an adhesively bonded glass clad laser glass half disk.
Figure 3:
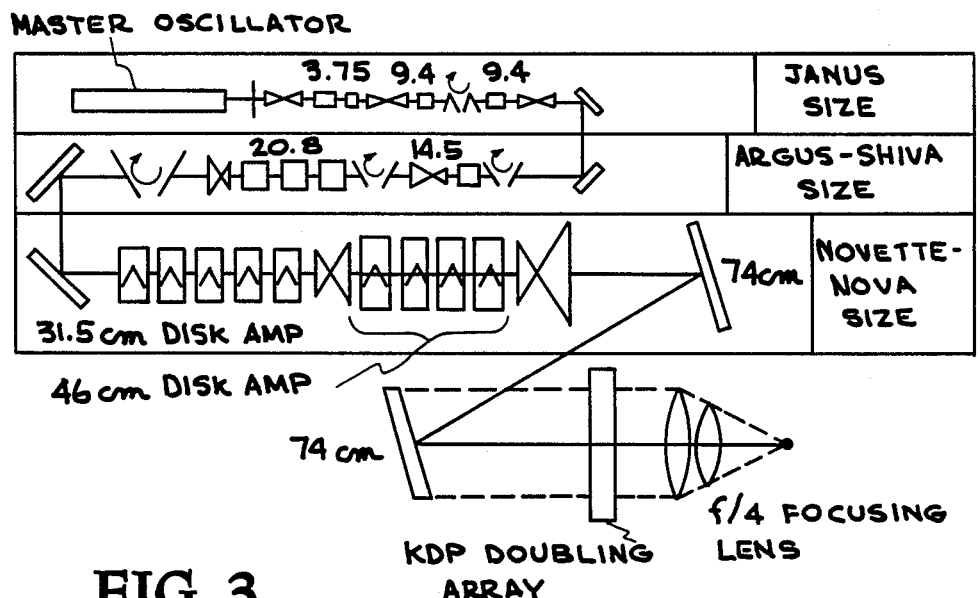
FIG. 3 shows a top plan view of the Janus, and Argus-Shiva, and the NOVETTE-NOVA laser architectures.
Figure 4:
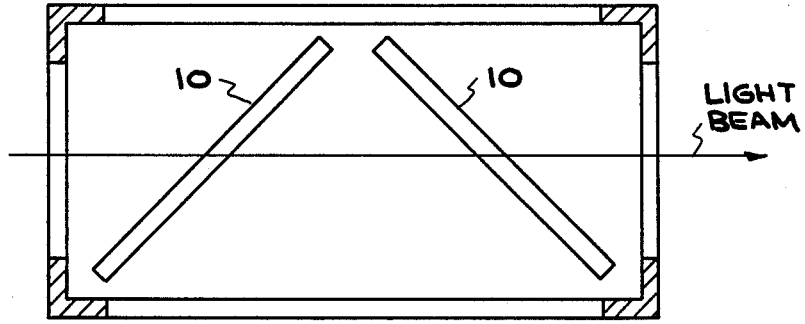
FIG. 4 shows a top plan view of the tilt cut laser disks as they appear in a perpendicular orientation the NOVA laser.

The present invention relates to a method regarding a cladding design consisting of flat strips of Cu-doped glass 12 that are bonded to the outside of the laser disks 11 using a bonding agent, such as an epoxy structural adhesive 13 (FIG. 1 and 1B). The laser glass disk 10, rather than being cut in an elliptical shape as in the past, are cut into 6 or 8-sided polygonal shapes, i.e. 6 or 8 sided polygons 11 to provide flat surfaces to which the cladding is bonded. Other shapes are possible which also store energy. Also, the disk edges are machined with a slight tilt (0.1-5°). As will be shown, this configuration greatly reduces the risk of bond failure, and significantly reduces the need for an exact refractive index match of various cladding components. Additional parameters and requirements are described hereinbelow.

1. Amplified Spontaneous Emissions (ASE)

The effects of ASE and parasitic oscillations on energy storage in large aperture amplifiers has been examined. A brief physical explanation is provided of the process as it relates to our development of the edge cladding.

During optical pumping, some of the excited Nd-atoms spontaneously decay, emitting photons at the frequency of the laser transition. These photons will subsequently be amplified as they travel through the laser gain media. The signal gain (G) is given simply by:

$$G = I/I_o = exp(\alpha \cdot l) \qquad (1)$$

where $I_o$ (watts) is the initial intensity and I (watts) is the intensity after traveling a distance l (cm) through a medium having a positive gain coefficient, $\alpha(cm^{-1})$.

In a disk amplifier, approximately 75% of the decay photons are emitted at angles greater than the critical angle for total internal reflection (TIR). Thus, these photons become "trapped" between the disk faces and travel through the disk by TIR until reaching the edge.

Figure 6A:
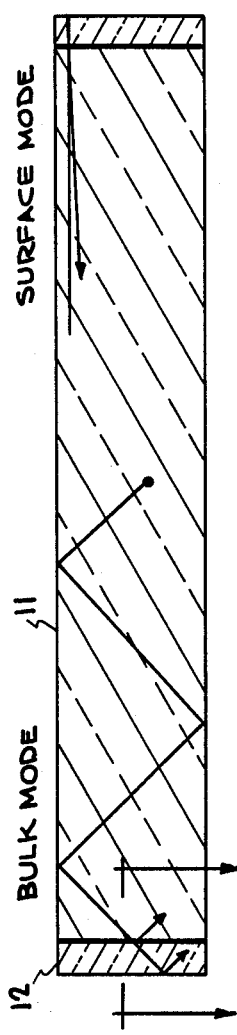
FIG. 6 is (a) schematic view of laser disk in cross-section showing amplified spontaneous emission (ASE) and 6(b) shows resulting parasitic oscillations due to reflection at the disk boundary. Surface parasitics are difficult to suppress because of the greater gain coefficient near the disk surface as shown 6(c), this gain profile calculated for 4.3 cm thick, $2 \times 10^{20}$ cm$^{-1}$ Nd-doped laser disk.
Figure 6C:
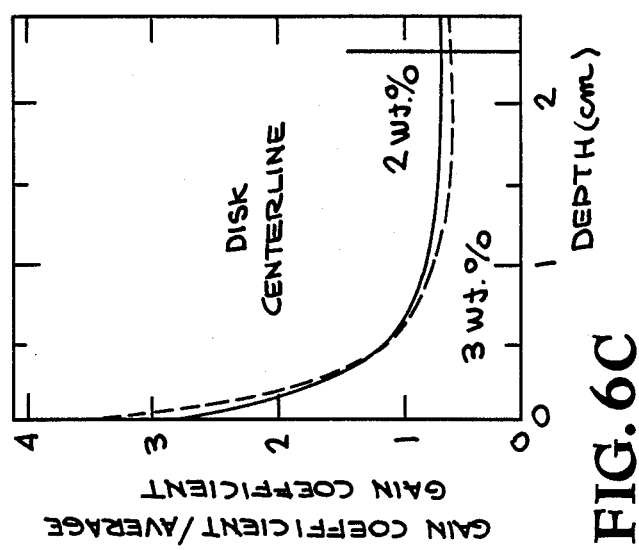

Upon reaching the disk edge, the ASE can be totally or partially reflected back into the disk (FIG. 6). If the gain in traversing the disk exceeds the edge reflection losses then the process can proceed indefinitely. This effect is referred to as a parasitic oscillation. In other words, parasitic oscillations are suppressed as long as R·G <1, where R is the reflectivity from the edge and G is the gain as described above.

It is important to note that two general modes of parasitic oscillations may occur within a disk. See, for example, D. C. Brown, *High-Peak-Power Nd:glass Laser Systems*, Chapter 5, Springer-Verlag, New York, N.Y., published in 1981. One is a bulk-mode parasitic and refers to rays undergoing lossless reflections at the disk faces (FIG. 6a). The threshold condition for this mode is:

$$G \cdot R_\theta = exp(\alpha n L) \cdot R_\theta = 1 \qquad (2)$$

where n is the refractive index of the disk at the ASE wavelength, $\alpha cm^{-1}$) is the thickness-averaged gain coefficient and L is the length of the major axis of the disk (cm). $R_\theta$ is the reflectivity at an angle of incidence of 90°-$\theta_{TIR}$ which for our case is about 49°.

The second major parasitic mode is the so-called surface mode and refers to rays traveling just beneath and parallel to the disk surface (see FIG. 6a). These rays undergo normal reflection at the disk edge (if the edge is perpendicular to the disk face) and have the characteristic threshold condition:

$$R_N G_s = exp(\alpha_s L) \cdot R_N = 1 \qquad (3)$$

where $\alpha_s$ (cm$^{-1}$) is the gain just below the disk surface and $R_N$ is the reflectivity normal to the cladding interface.

Figure 6B:
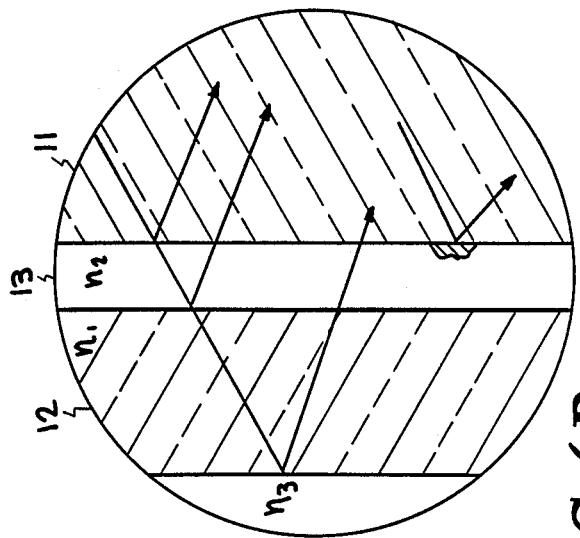

For large aperture disks with high Nd-doping levels, the gain profile through the disk is not constant (see FIG. 6b). The gain is greatest at the disk faces and decreases to a minimum at disk center. See, J. M. Soures, et al., *Applied Optics*, Vol. 12, p. 927, published in 1973. For example, for Nova 31.5 cm aperture disks, the ratio of the surface-to-bulk gain coefficient is about 3 for a 2% Nd doping level. Thus in large disk amplifiers the gain associated with surface parasitics are far greater than for the corresponding bulk modes.

Table 1 summarizes the expected gains for parasitic modes in the largest Nova laser disks. From these, the maximum edge reflectivity that can be tolerated is calculated using the above threshold criteria.

TABLE 1

Calculated surface and bulk-mode gains and the required edge-cladding index match needed to suppress bulk and surface mode parasitics in Nova 31.5-cm and 46-cm disks. The Nd-dopings are 2 and 3 × 10$^{20}$-ions/cm$^3$.
The cladding interface is assumed to be normal to the disk surface.

| | 31.5 cm Disk [Nd-doping(cm$^{-3}$)] | | 46 cm disk [Nd-doping (cm$^{-3}$)] | |
|---|---|---|---|---|
| | 2 × 10$^{20}$ | 3 × 10$^{20}$ | 2 × 10$^{20}$ | 3 × 10$^{20}$ |
| I. Disk characteristics | | | | |
| Refractive index | 1.520 | 1.520 | 1.520 | 1.520 |
| Average gain coeff. $\alpha$ (cm$^{-1}$) | 0.057 | 0.058 | 0.053 | 0.057 |
| Ratio surface-to-avg. gain, $\alpha_s/\alpha$ | 3.0 | 3.8 | 3.0 | 3.8 |
| longest gain path (cm) | 6.15 | 6.15 | 47.8 | 47.8 |
| II. Bulk-mode parasitics | | | | |
| Bulk gain, exp. ($\alpha n D$) | 205 | 226 | 47 | 63 |
| Required cladding index match | 0.049 | 0.046 | 0.108 | 0.091 |
| III. Surface-mode parasitics | | | | |
| Surface gain, exp. ($\alpha_s D$) | 3.4 × 10$^4$ | 9.2 × 10$^5$ | 1.9 × 10$^3$ | 3.6 × 10$^4$ |
| Required cladding index match | 0.0082 | 0.0016 | 0.0035 | 0.0080 |

The primary sources for reflections are the refractive index mismatch and imperfections at the glass-/polymer/cladding boundary (FIG. 6a). Assuming for the moment that imperfections can be eliminated with the use of proper assembly methods, then the polymer-to-glass index match becomes the limiting element. In Table 1 is the calculated index match needed for a large NOVA laser disk to keep the reflectivity below threshold for both parasitic modes. In the calculations, it is assumed that the "worst-case" of in-phase addition of the two reflections. This is because the adhesive bond is thin (between 1 micron and 2 mm, preferably 1 to 50 microns especially about $\leqq 25$ μm) and the ASE has enough coherence that the two reflections from the glass boundaries interfere in-phase. It is clear from Table that the surface parasitic modes place the most severe restriction on the refractive index match of the polymer to the glass disk.

It is apparent that even small delaminations at the cladding-to-glass bond cause reflections that can lead to parasitic oscillations. As discussed later, one strategy concerns cutting a slight tilt in the disk edges to reduce the threat from small bond delaminations near the disk face. This strategy has an added benefit in that it also reduces the index match required for preventing the surface mode parasitic.

2. Technical Requirements of a Polymer-Based Cladding

There are five key performance requirements that a polymer-based cladding must meet.

Figure 7A:
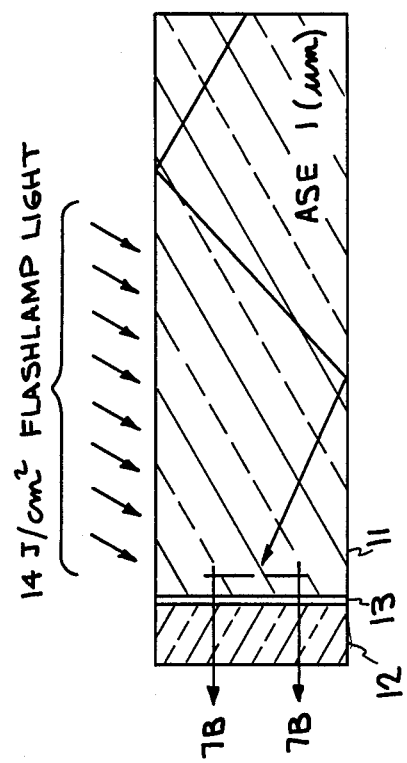
FIG. 7 (a) shows the combined 1.06 $\mu$m ASE and broadband flashlamp fluence at the polymer bond for a NOVA disk is about 20 J/cm$^2$ with about 9 J/cm$^2$ originating from ASE.
FIG. 7(c) shows a typical instantaneous spectral distribution of the flashlamp light after passing through the CeO$_2$-doped flashlamp envelope and blast-shields. Below 400 nm it rapidly drops to zero due to the absorption by the CeO$_2$ dopant.
Figure 7B:
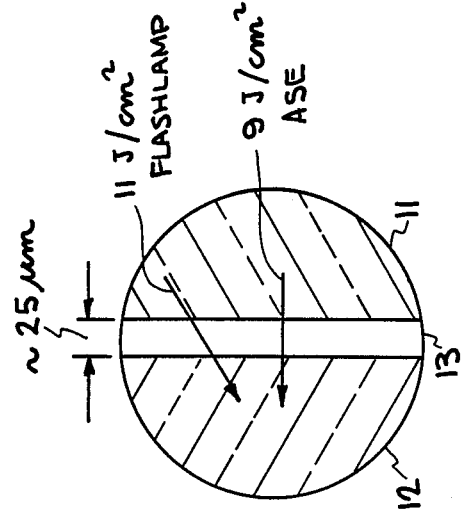
Figure 7C:
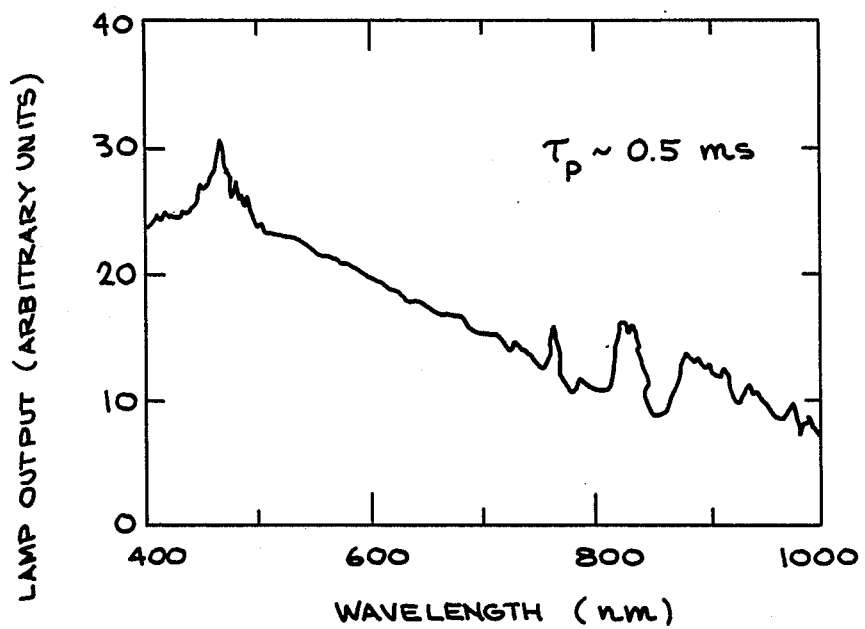

FIRST, the polymer must be able to tolerate the high radiation fluence inside the amplifier without damage. The incident light on the polymer originates from the combined broadband radiation from the Xe-flashlamps and the 1060 nm ASE in the disk (FIG. 7). It is calculated that the total fluence incident on the polymer in the NOVA system is about 20 J/cm$^2$; this consists of approximately 11 and 9 J/cm$^2$ contributions of flashlamp light and ASE, respectively. The duration of this fluence is about 0.5 ms. The flashlamp emission below 350 nm is strongly absorbed by the Ce-doped glass envelopes of the flashlamps and the silicate glass blast shields. Also, the laser glass attenuates the 14 J/cm$^2$ of flashlamp light incident on the disk surface to about 11 J/cm$^2$ at the cladding interface. This is due to the intrinsic absorption of the Nd-ions in the glass.

SECOND, the cladding must absorb the ASE and suppress the onset of parasitic oscillations. The ASE can be adequately absorbed by choosing a cladding material (e.g. glass) with the proper doping level and thickness. It is calculated that for our specific NOVA application the product of the cladding absorption coefficient and thickness should be greater than 1.8. For example, if the cladding thickness is limited to no more than 0.6 cm then the cladding absorption at 1060 nm needs to be at least 3.0 cm$^{-1}$ Assuming that a properly doped cladding is used, then the suppression of parasitics depends on the refractive index match at the glass-to-polymer interfaces and the lack of imperfections that may cause Fresnel reflections. This requirement is discussed in the previous section and is summarized in Table 1.

THIRD, the bond must be a strong adhesive bond. The bond must be strong enough to withstand (a) the mechanical stresses in grinding and final polishing of the disk faces and (b) the repeated thermal stresses due to ASE absorption in the cladding. The bond must be able to repeatedly endure both the peak stresses and high strain rates associated with this interface heating.

FOURTH, the cladding needs to be relatively easy and inexpensive to apply. This is primarily a processing rather than a technical constraint. It is of major importance however, since the primary reason for developing a new cladding process is to reduce the overall laser disk cost.

FIFTH, the cladding must be able to withstand, without degradation, a large number of amplifier firings. For our specific NOVA application, a minimum value of 2000 shots is required. This is roughly the number of laser shots occurring over a period of about 4 years on the Nova system.

The epoxy cladding of the present invention will generally withstand many more shots than this minimum requirement.

3. Choice of Cladding Configuration

The use of a polymer to bond edge cladding to laser disks was first reported by Murray et al., (1984), supra, (also, see J. E. Murray, et al., "Silicone Rubber Edge Claddings for Laser Disk Amplifiers", CLEO 84, paper THF-2 (June, 1984) describing their work on the experimental, single segment amplifier (SSA). The SSA used rectangular-shaped disks of a non-standard glass. Without further development it was not possible to use the silicon rubber glass cladding with these disks. Therefore, adhesively bonding the glass cladding to the laser disk provided another alternative to the conventional cladding method. The polymer used by Murray et al. was a silicone rubber index-matched to the laser glass. Although successful in this experimental application, the process was not developed to the point where it could be used in full production because of dirt particle adhesion problems.

The primary cladding configurations considered are a variation of the same concept. These new designs use a copper-doped absorber that is bonded to the laser disk using a polymer adhesive.

Figure 8A:
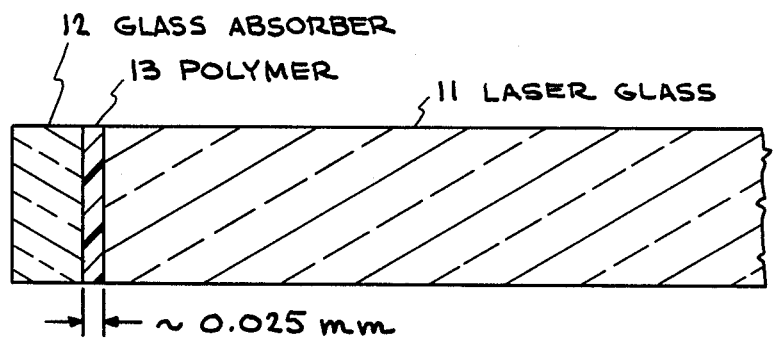
FIG. 8 shows three configurations of polymer-based edge claddings that were evaluated during development: (a) a glass absorber bonded with a thin line of adhesive, (b) a glass absorber embedded in a cast polymer and (c) a monolithic polymer containing a dispersed or dissolved absorber.
Figure 8B:
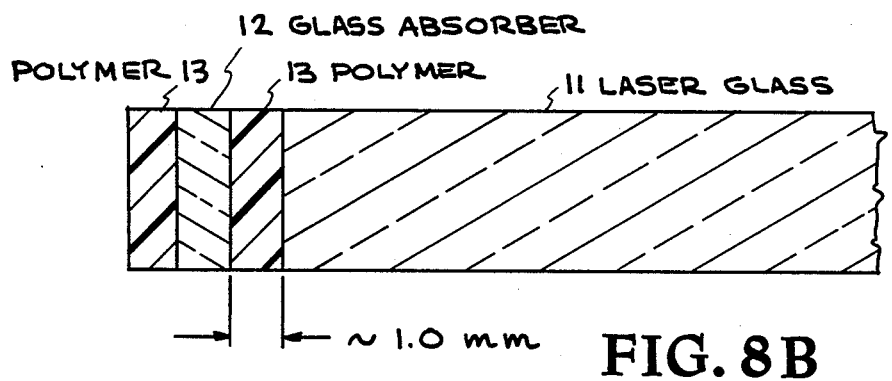
Figure 8C:
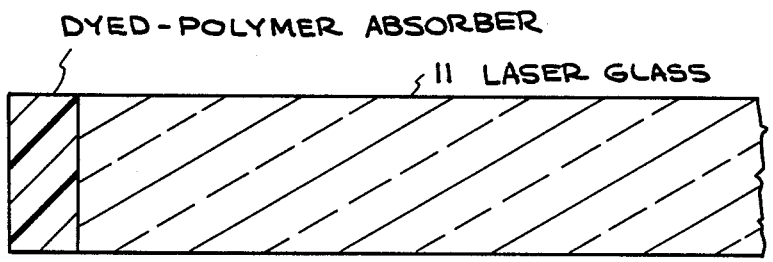

In the first design to reduce SSA, he glass cladding is embedded in the polymer forming a relatively thick bond-line (FIG. 8b). In this design, the polymer serves to bond the cladding to the disk as well as bond the disk assembly into the disk holder. This is similar to the design used by Murray et al (supra) for the SSA tests.

A second design uses a very thin bond ($\leqq 25$ μm) to adhesively bond the cladding to the laser disk (FIG. 8a). This bond is formed by applying adhesive to the adjoining faces of the disk and cladding glass and then lightly pressing (about 2-5 psi) them together until the adhesive cures.

The thin bond-line concept is the system of choice for several reasons. First, it minimizes the amount of polymer used and therefore lessens the chance for polymer damage due to optically absorbing contaminates. Second, we found that the small bond-line eliminates optical damage sites at the polymer/air surface apparently caused by particulates that accumulate during grinding and polishing of the disk and cladding. It is also easier to clean. Third, the fabrication of the overall disk dimensions remain nearly the same and thus can be used in our present amplifier without extensive modification or reduction of clear aperture.

In another embodiment, the polymer would serve as both the adhesive and the absorber matrix. The absorber could be a dye homogeneously distributed in the polymer matrix or a heterogeneous mixture of absorbing (i.e. opaque) particles suspended in the polymer. Conceptually, this is a simple design using a single component that, in principle, could be easily and cheaply applied. The disadvantage with this design is that the volume of polymer used is large. This increases the chance for failure due to polymer damage. Also, an absorber or dye must be found that does not bleach or otherwise fail when exposed to the high fluences in the amplifier. Finally, differences in the elastic modulus between the glass and polymer would make optical finishing (i.e. grinding and polishing) difficult or even require application of the polymer cladding after optical finishing. The latter is a difficult task.

4. Adhesive Polymer Selection

The selection of the bonding (polymer) for cladding applications is based on both its optical/mechanical properties and its processing characteristics. Optionally, the polymer needs to be clear, colorless, non-scattering and a close index match to the laser and cladding glass (for NOVA about 1.520 at 1053 nm). Mechanically, the maximum use temperature (for the NOVA disk - this is about 35° C.). Therefore, during the selection process we examined polymers that would gel at room temperature and then fully cure to the desired $T_g$ with only moderate heating.

Approximately twenty polymers were evaluated from six major classes of adhesives. Epoxies were finally selected because they best satisfied the criteria outlined above. A commercially available epoxy with the required refractive index and processing characteristics is not available. Consequently we formulated our own epoxies from commercially available resins and curing agents.

The resulting formulation is an amine-cured epoxy having the composition give in Table 2; the epoxy curing reaction is shown schematically in FIG. 9. Note that epoxies are two-part adhesives.

TABLE 2

Composition, Structure and Refractive Index of Epoxide Resins and Amine Curing Agents Used to Prepare the Cladding Adhesive.

| Name | Structure | Refractive Index ($n_D$) Measured | Refractive Index ($n_D$) Calculated | Ht. % |
|---|---|---|---|---|
| Part A: Epoxide Resins | | | | |
| 1. diglycidal ether of bisphenol A | (structure shown) | 1.5704 | 1.5709 | 30.4 |
| 2. diglycidal ether of 1,4 butanediol | (structure shown) | 1.4626 | 1.4674 | 34.3 |
| Part B: Amine Curing Agents | | | | |
| 1. Mixture of polyether triamines | (structure shown, $x + y + z = 5.3$) | 1.4595 | 1.4570 | 32.0 |
| 2. Accelerator: triethanolamine piperazine | $N\text{-}(C_2H_5OH)_3$ (piperazine structure) | 1.4951 | 1.4914 | 3.3 |
| aminoethylpiperazine | (structure shown) | | | | polymer must function as a structural adhesive with excellent mechanical and adhesive strengths and a high Young's modulus. Also, it must remain undamaged after several thousand shots in the high fluence amplifier environment.

From a processing viewpoint, the polymer (or the reactants required to form the polymer) must be readily available, have high purity and be easily filtered to remove any particles larger than 1 micron, preferably less than 0.5 micron. Also during application, the polymer must not release any volatile components, have a working time sufficient for the assembly time (approximately 1 hr.) and shrink little during cure (less than about 7 percent, preferably less than about 5 percent by volume).

In this application, it is also desirable to have a polymer with a glass transition temperature ($T_g$) above the One part ("Part A") is liquid resin that consists of molecular components that each contain two or more of the characteristic three-member cyclic ethers that are called epoxide groups. The second part ("Part B") consists of a material that will react with the epoxide groups ultimately forming a continuous polymer network (FIG. 9). Over 50 different functional groups are known to react with epoxides. See, for example, H. Lee and K. Neville, *Handbook of Epoxy Resins*, McGraw-Hill Book Co., New York, N.Y., published in 1967, Chapter 4, which is incorporated herein by reference. For this application, a mixture of amine-based compounds is chosen (Table 2) since they react reasonably quickly near room temperature.

The composition of this adhesive is uniquely suited for this application for several reasons. First, the resin is a mixture of an aliphatic (diglycidal ether of 1,4-butanediol) and aromatic (diglycidal ether of bisphenol A) epoxides. By varying the ratio of these components the refractive index is adjusted to the value desired. Second, the amine is specially formulated to meet the processing requirements. A small amount of a mixture of low-molecular-weight, primary amines is used as an accelerator to gel the epoxy in a few hours at room temperature. This allows sufficient time to complete the assembly operation yet also permits us to remove the disk from the gluing (clamping) fixture in just a few hours. The remainder of the part B curing agent is a higher molecular weight polyether-triamine that upon full cure gives the desired $T_g$. To accomplish the complete cure the clad laser disk is heated to a moderate temperature (80° C.) for four hours. The glue is delicate to formulate.

A typical epoxy formulation includes:

between about 50 and 55 parts of an aromatic bisepoxide, preferably about 53 parts;

between about 45 and 50 parts of an aliphatic bisepoxide, preferably about 47 parts;

between about 47 and 52 parts of an aliphatic polyether triamine, preferably about 49.4 parts; and between about 3 and 7 parts of an amine accelerator, preferably about 5 parts.

More specifically, the aromatic bisepoxide is the diglycidal ether of bisphenol A; the aliphatic bisepoxide is a diglycidal ether of a $C_1$ to $C_6$ aliphatic diol, especially 1,4-butanediol; the aliphatic polyether triamine as shown in Table 2; and the amine accelerator is selected from triethanol amine, piperazine, aminoethylpiperazine or mixtures thereof.

The epoxy materials are available from Kodak (as Kodak Optical Cement), Rochester, N.Y.; Epoxy Technologies of Billercia, Mass., and the like.

5. Damage Resistance

As discussed above, one of the most important properties of the cladding polymer is its optical damage resistance.

There are two key mechanisms leading to optical damage in epoxy polymers. The first is pyrolysis caused by localized heating near absorbing inclusions and the second is photolysis by short-wavelength radiation (<350 nm for epoxies of interest in this application). Both of these damage mechanisms are well known and were reported a number of years ago in a study by Lundberg et al., in "Carbon Formation by Flash Illumination of Polymers", in the *Proceedings of the Third Conference on Carbon*, p. 411, Pergamon Press, published in 1957, of flashlamp-induced damage in other types of polymers.

In the case of pyrolysis, the extent of damage is governed by the thermal decomposition kinetics; thus the time-temperature history the polymer experiences is critical. For example, a polymer can be briefly (for time scales of the laser up to about 0.5 milliseconds) heated to a temperature far in excess of its typical decomposition temperature without undergoing extensive pyrolysis. This is simply because there is insufficient time for significant polymer reaction during rapid heating and cooling. Of course there is some degree of decomposition but this may not be readily detected until the polymer is repeatedly heated under the same conditions many times.

Polymer pyrolysis products generally absorb strongly in the visible region of the spectrum. This is because they contain conjugated structures having low energy $\pi$-$\pi^*$ or n-$\pi^*$ electronic transitions. Therefore the decomposition products themselves can cause either further localized heating or photolysis or both. The net result is that the extent of pyrolysis (i.e. damage) may rapidly grow with successive shots. We have seen this effect in several flashlamp-damage tests conducted on optical epoxies. What is initially observed as small black damage spots, widely distributed through the polymer, becomes massive regions of black decomposed polymer after just a few more shots.

The key feature in regard to the above mechanism is that once damage is initiated it will rapidly grow to the point where it causes catastrophic failure. As a consequence, extensive measures must be taken to remove all sources of absorbing inclusions from the polymer starting materials. This observation is not new and has been made by many others studying laser damage in polymers. See, for example, R. M. O'Connell and T. Saito, "Plastics for High-Power Laser Applications: A Review", *Optical Engineering*, 22, 393 (1983) and references cited therein; A. A. Manenkov and V. S. Nechitailo, "Role of Absorbing Defects in Laser Damage to Transport Polymers", *Sov. J. Quantum Electron.*, Vol. 10, p. 347 published in 1980); and R. M. O'Connell, et al., "Laser Damage in Plastics at FJSRL", in Laser Induced *Damage in Optical Materials:* 1983: Proceedings of the Boulder Damage Symposium, No. 1983; Boulder, Col., p.59. In fact, preparing clean starting materials has been the focus of much of the effort in making polymers with higher damage thresholds.

To eliminate possible damage due to absorbing inclusions we have used a filtration system capable of removing particles larger than about 1 micron, preferably larger than 0.5 $\mu$m. Also all polymer preparations, glass surface treatment and cladding operations are carried out under clean conditions, preferably in a class-100 cleanroom. Using this technology, the damage resistance of the amine-cured epoxy is increased to the point where it can be safely used in this application.

The second mechanism for polymer damage is photolysis and is sensitive to the emission wavelength pump spectrum of the laser amplification. Many organic materials absorb strongly in the blue and near-UV and are particularly sensitive to photolytic damage by radiation from this source. See, A. V. Butenin and B. Ya. Kogan, Mechanism of Damage of Transparent Polymer Materials due to Multiple Exposure to Laser Radiation Pulses, *Sov. J. Quant. Electron,* Vol. 6. p. 611 (1976). In fact, photo-degradation and photo-oxidation is the reason for the poor environmental durability of most polymers, C. R. Wolfe, et al., "Optical Damage in Epoxy Polymers by Millisecond Light Pulses", in *Laser Induced Damage in Optical Materials:* 1986: Proceedings of the Boulder Damage Symposium, Nov. 1986; Boulder, Col., have shown that epoxy polymers with the least absorption in the blue and near-UV region of the spectrum suffer the least damage when exposed to the broadband emission from a Xe-flashlamp. Similarly, removing the UV component of the flashlamp emission, while keeping the total fluence fixed, also significantly reduces the amount of damage. See C. R. Wolfe, et al. (1986), supra.

Not wishing to be bound by theory, the above observations suggest that the damage produced under these particular conditions is at least in part caused by a photolytic rather than a pyrolytic mechanism. Unfortunately, this conclusion is clouded by the fact that the damage initiates in spots rather than uniformly throughout the polymer. This latter observation suggests pyrolysis, due to absorbing inclusions, rather than photolysis. Of course, it is probable that the two mechanisms are strongly linked and once decomposition starts they both proceed simultaneously. For example, it is well known that many products from polymer pyrolysis contain chromophoric groups (e.g. carbonyls, alkenes, etc.) that can cause further degradation by photolysis.

6. Suppression of Parasitic Oscillations

Preventing parasitic oscillations in the laser disk requires (a) a proper refractive index match between the epoxy and the laser and cladding glasses and (b) elimination of any bubbles or other reflecting defects in or at the interface of the cladding. As mentioned above, the polymer refractive index is matched to that of the glass by varying the ratio of aliphatic to aromatic components in the epoxide resin.

7. Refractive Index Matching

The refractive index (n) of a dielectric material in the visible and near-visible region is directly related to it electronic polarizability by the well known Lorenz-Lorentz relationship:

$$\left(\frac{n^2 - 1}{n^2 + 2}\right)\frac{M}{\rho} = \frac{4}{3} \pi N \alpha_e \quad (4)$$

where M is the molecule weight (g/mole), $\rho$ the density (g/cm$^3$), N Avagadro's number (mole$^{-1}$) and $\alpha_e$ the electronic component of the polarizability (cm$^{-1}$) The term on the left hand side is known as the molar refraction, R, and to a good approximation consists additively of the electronic polarizability contributions of individual bonds and functional groups in the molecule. See, N. E. Hill, W. E. Vaughan, A. H. Price and M. Davises, *Dielectric Properties and Molecular Behavior*, Van Nostrand Reinhold Company Ltd., Lond, 1969, Chapter 4. Therefore, in a polymer it is possible to adjust the refractive index by adding or subtracting functional group components with different polarizabilities. This is the approach we have used to index match the polymer to the glass.

Figure 10:
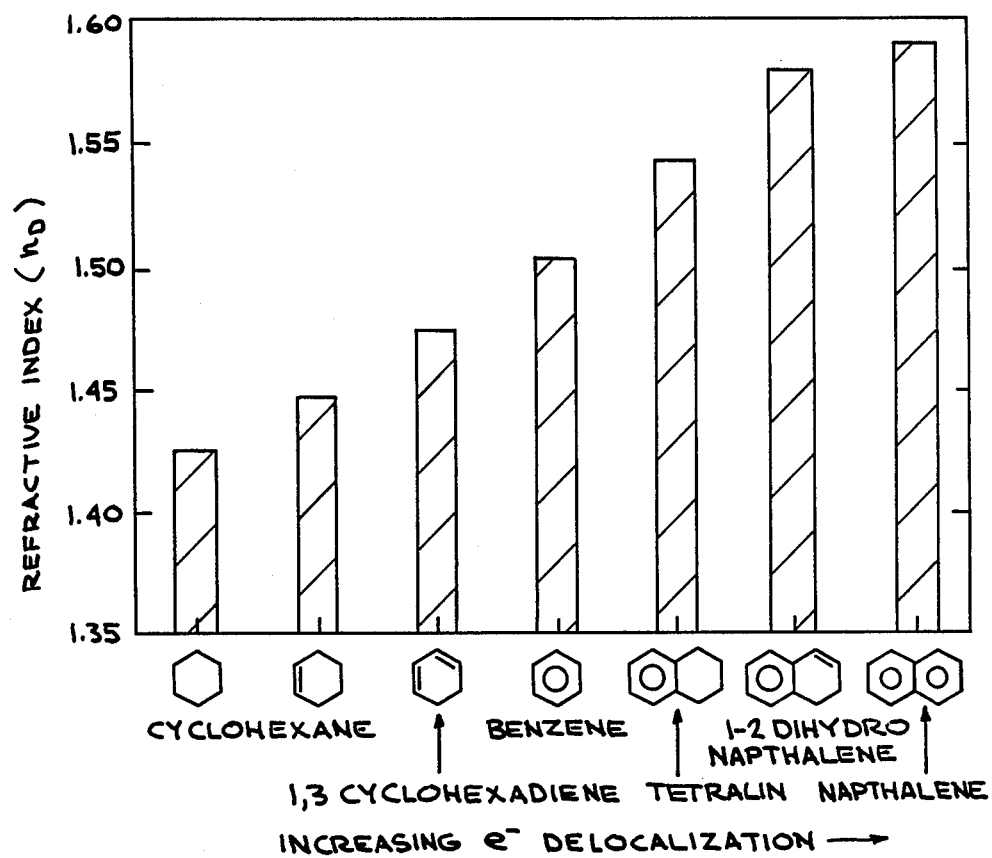
FIG. 10 shows the refractive indices of a series of hydrocarbons with an increasing polarizability (caused by electron delocalization $\pi$-bonds).

Delocalization of the electrons in conjugated $\pi$-bonded systems dramatically increases the polarizability and hence the refractive index. Consequently, aromatic compounds have higher indices of refraction than the corresponding aliphatic materials. This is clearly illustrated in FIG. 10 where the refractive indices are plotted for a series of compounds, see, *CRC Handbook of Chemistry and Physics*, R. C. Weast Editor, 67th Edition, CRC Press Inc., 1986, having varying degrees of $\pi$-bond conjugation.

The refractive index region of interest can be bracketed by using diglycidal ether derivatives of bisphenol A and 1,4-butanediol. The refractive indices of these materials are given Table 2. Also given are the calculated indices based on additivity of functional group contributions to the molar refractions, i.e.:

$$n = \left[\frac{1 + \frac{2\rho R_T}{M}}{1 - \frac{\rho R_T}{M}}\right]^{\frac{1}{2}} \quad (5)$$

where $R_T$ is the sum of the molecular refraction contributions from the various functional groups in the polymer structure:

$$R_T = \sum_{i=1}^{n} R_i \quad (6)$$

The group contributions ($R_i$) are based on the values compiled by Goedhart as summarized by D. W. VanKrevelen, *Properties of Polymers. Their Estimation and Correlation with Chemical Structure*. Elsevier Scientific Pub. Co., New York, 1976, Chapter 10.

Figure 11:
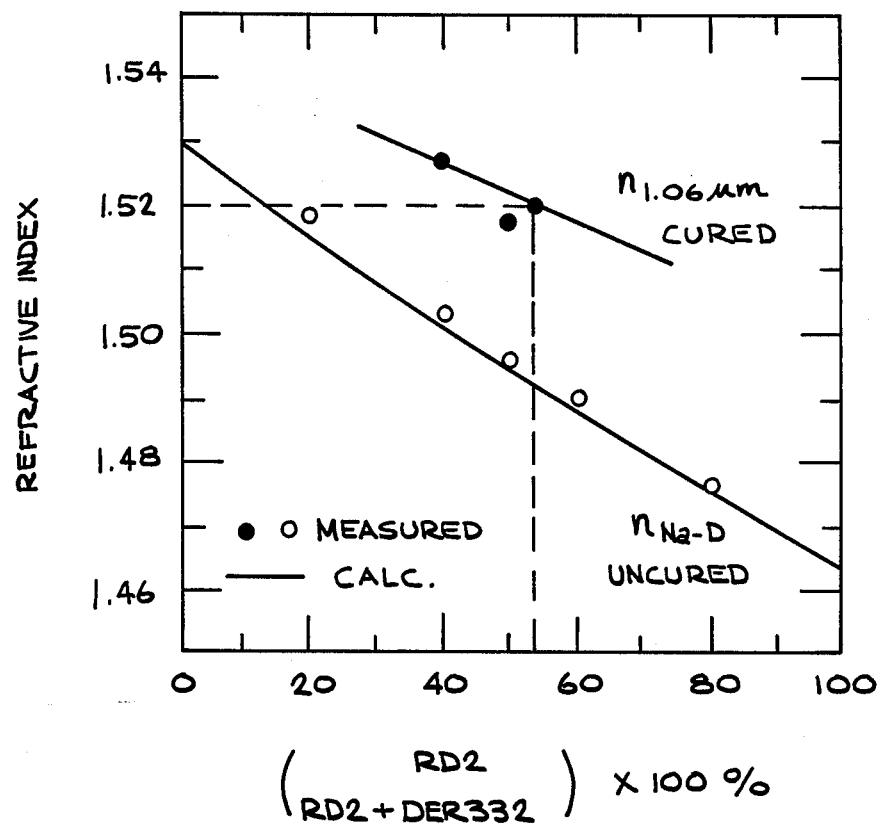
FIG. 11 shows a graph of measured (·) and calculated (—) refractive indices at 589 nm (NaD line) for uncured and at 1052 nm for cured epoxy mixtures. The dotted line is the composition of cured epoxy used to match the 1.520 index of the phosphate glass of the NOVA laser.

FIG. 11 compares the calculated and measured refractive indices for both cured and uncured mixtures of epoxy resin and amine curing agent. The cured polymer has a different index than the unreacted mixture because of both the change in molecular structure and the change in density that occurs during reaction. The change in structure is due to reaction between the amine and epoxide groupings and increases the index by about 0.007. The rest of the increase is due to the 6 to 7% densification that occurs upon complete curing of this particular epoxy. The generally good agreement between the calculated and measured index values demonstrates the usefulness of the additive relationship. By using the curves in FIG. 11, it is possible to pinpoint the composition that must be used to index match the glass.

The refractive index calculations are for 589 nm (Na-D) and must be corrected for dispersion since we require an index match at 1060 nm. The n change in the epoxy between 589 and 1052 nm is 0.0128±0.0005.

8. Parasitic Oscillations Caused by Bond-Delaminations

As mentioned above, reflections from bubbles or other imperfections at the cladding interface can give rise to parasitic oscillations. The most serious threat is from imperfections that occur near the disk face since the gain for surface parasitics is much greater than for bulk modes.

One recurring problem is the presence of very small, almost microscopic, delaminations of the adhesive bond at the disk surface. The delaminations are apparently caused by stresses on the bond joint that occur during the final disk grinding and polishing.

In the case of a Nova 31.5-cm disk with parallel ends, Trenholme, supra, estimated that a long, thin delamination only a few microns in width could cause the onset of surface parasitic oscillations. In one experiment, cladding failure was observed to occur at the end of a 31.5-cm disk due to growth of small delaminations into large-scale bond separation. This failure is caused by surface parasitic oscillations initiated by small (<100 micron) delaminations at the disk surface. The parasitic oscillation extracts energy from the disk and, rather than distributing it uniformly over the entire area of the cladding, deposits it in a small region near the edge of the delamination. This in turn increases the thermal stresses causing the bond separation to grow. After only a few amplifier shots, the delamination grows dramatically leading to a large scale bond failure.

A strategy has been developed for dealing with small bond delaminations on the Nova disks by slightly tilting the disk edges. This is shown schematically in FIG. 12a. The tilts prevent rays traveling near the surface from being Fresnel-reflected back along the same high-gain path. Instead they are reflected back into the lower gain interior of the disk and away from any possible surface separations on the opposing edge. The idea of slightly tilting the disk edges to prevent surface parasitics was also used by the Laboratory for Laser Energetics at the University of Rochester, Rochester, New York, in the design of the active mirror amplifier. See D. C. Brown, *High-Peak-Power Nd:glass Laser Systems*, Springer-Verlag, New York, 1981, p. 156–157.

Figure 12:
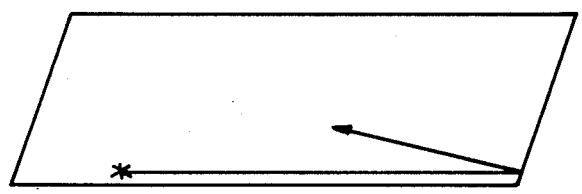
FIG. 12 shows a (a) schematic drawing of disk edge tilt geometry in 2-D showing reflection of a hypothetical surface ray into the disk interior. (The size of the angle is exaggerated.) (b) The actual combination of tilted edges that will be used on the 46 and 31.5-cm Nova disks.
Figure 12:
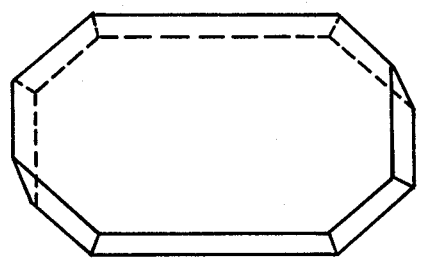
Figure 12:
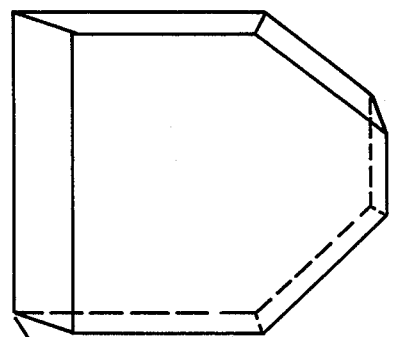

Using a Monte Carlo ray-tracing program, it can be shown that tilt angles of between about 0.1° to 5°, preferably about 1.4° from the perpendicular on the disk peripheral edges are sufficient to suppress parasitic oscillation from delaminations up to 1-2 mm in width. Based on the Monte Carlo calculations, it is determined that effective tilt geometries for all edges of the 46-cm and 31.5-cm disks are as shown in FIG. 12b; this is the final configuration chosen for the NOVA cladding application. Other applications may require slightly modified geometrics.

The significance of the edge-tilting strategy on relaxing requirements for other aspects of the cladding should not be overlooked. Note that by cutting a tilt into the peripheral edges, potential surface parasitics are essentially diverted into bulk modes. From results in Table 1 it is clear that this strategy greatly relieves the index-matching requirement. In the NOVA case, we were able to maximize the strength and processing characteristics without affecting our ability to match the index of the glass. However, in some cladding applications it may not be possible to both match the index and meet the other polymer specifications. In those cases, the use of tilts gives the polymer chemist greater freedom in formulating a practical adhesive.

9. Estimates of Thermal Stresses

Figure 13A:
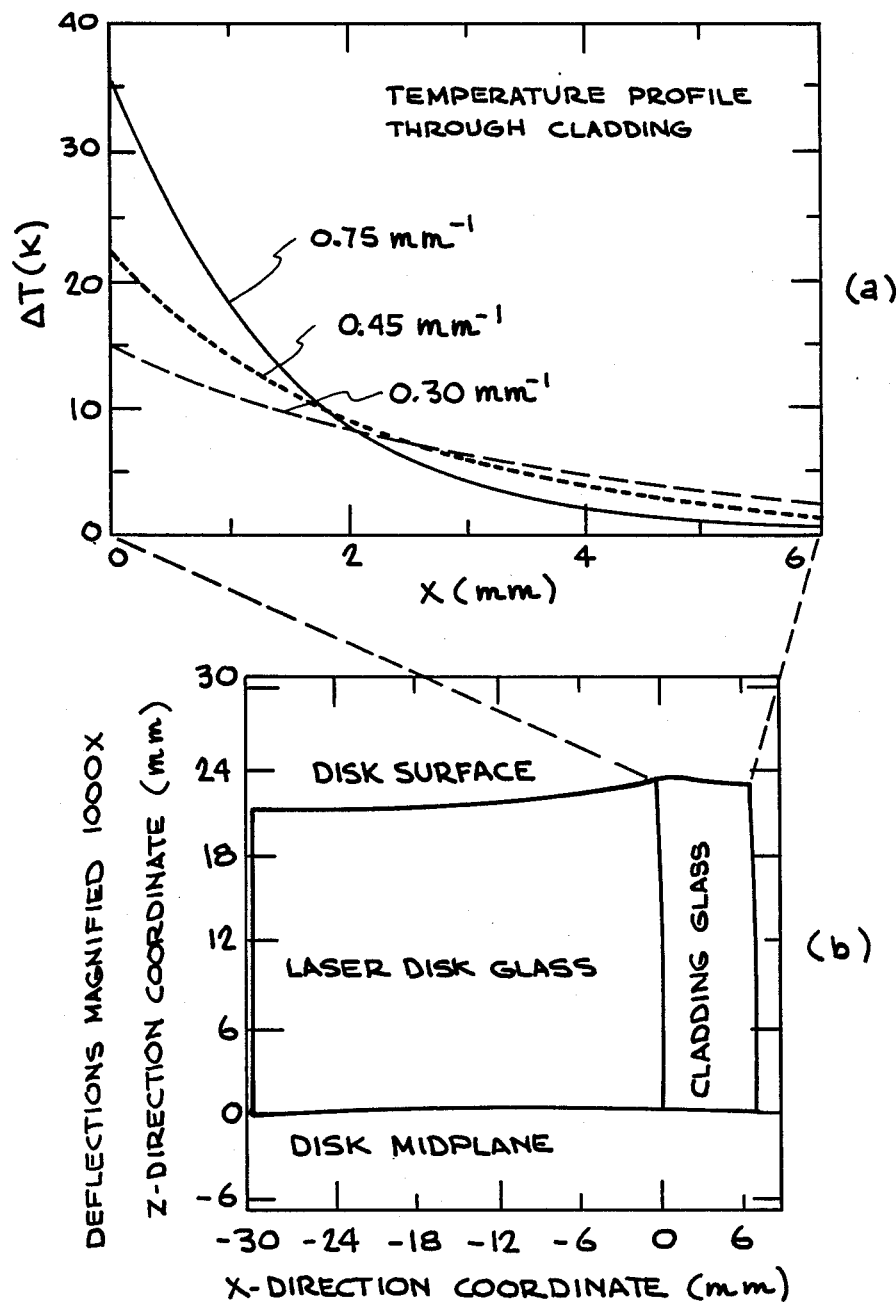
FIGS. 13A and 13B show (a) the instantaneous temperature profile through the cladding for 3 different cladding absorption values and (b) the calculated deflection and stresses perpendicular (c) and parallel (d) to the cladding interface as computed with Equation (7). These stress calculations correspond to the temperature rise produced by the 7.5 cm$^{-1}$ absorption cladding.
Figure 13B:
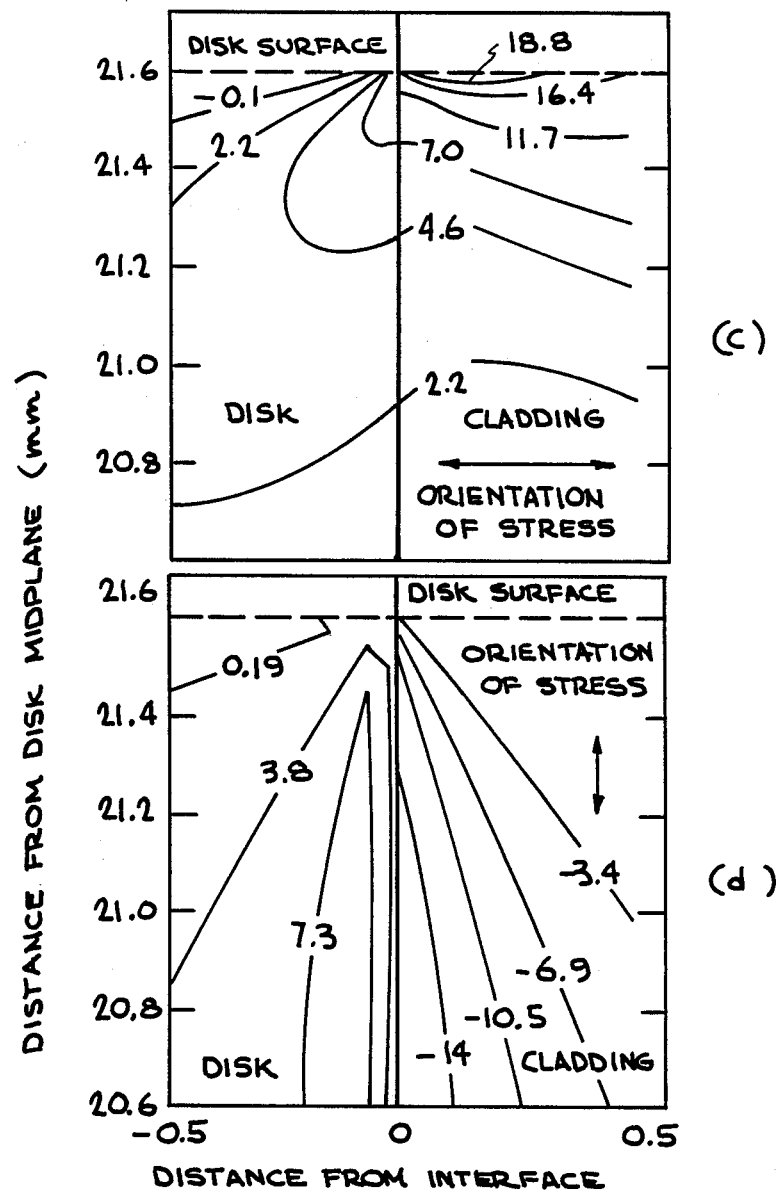

The absorption of the ASE energy in the cladding glass causes a corresponding increase in temperature and the resultant development of thermal stresses. The temperature rise, $T(x)$, through a uniform absorber receiving an instantaneous incident flux, $I_o(J/cm^2)$, is simply given by:

$$T(x) = \frac{I_o \cdot \beta}{\rho g \cdot C_p} \exp(-\beta x) \quad (7)$$

where $\rho_g$ is the glass density (2.83 g cm$^2$), $C_p$ the specific heat (0.72 J/g·K) and, $\beta$ the absorption coefficient of the cladding glass at 1 µm. The cladding glass is designed to absorb strongly at 1 µm with relatively little absorption in the visible region. Consequently, there is a negligible contribution to the temperature rise from the flashlamp light. FIG. 13 shows the expected temperature profiles through the cladding glass as calculated by eq. (7). The results are for three different values of cladding absorption with an incident ASE fluence of 10 J/cm$^2$. The peak temperature rise occurs at the cladding interface ($x=0$) and is proportional to the cladding absorption coefficient; thus doubling the cladding absorption coefficient doubles the temperature rise at the interface. J. H. Pitts, et al., "Thermal Stress in the Edge Cladding of Nova Glass Laser Disks", in the *Proceedings of the 12th Symposium on Fusion Engineering*, Oct. 12–16, 1987, Monterey, Calif., have modeled the thermal stresses near the cladding interface using a two-dimensional finite-element stress analysis code. Their results for a 2-D cut through the Nova disk are shown in FIGS. 13b–d; only a half-thickness of the disk was modeled since the problem is symmetric about the disk midplane. The temperature distribution assumed in the calculations corresponds to a cladding absorptivity of 7.5 cm$^{-1}$ which gives a peak temperature rise at the interface of 36° K. (see FIG. 13a). FIG. 13b shows the predicted strains (magnified 1000×) and FIGS. 13c and 13d the corresponding stress distributions perpendicular and parallel to the cladding interface. Table 3 summarizes the peak stresses (MPa) in the cladding, the laser disk and at the cladding/laser glass interface.

During heating, the expansion of the cladding is restricted by the adhesive bond to the laser disk causing lateral bending of the disk surface. This is clearly shown in the plot of the predicted material strains (FIG. 13b). The bending motion produces high tensile stress in the cladding that is perpendicular to the adhesive interface. This stress is particularly important since it can delaminate the adhesive bond and/or break the cladding glass.

Shear (parallel) and cleavage (perpendicular) bond strengths of 24 and 25 Mpa are measured, respectively, for phosphate glass bonded with the epoxy adhesive. These would appear to be sufficiently strong bonds based on the predicted maximum stresses (8-10 MPa) given in Table 3.

TABLE 3

Peak thermally induced stresses from ASE absorption in a clad Nova laser disk as calculated with the 2-D finite-element, stress analysis code[34] (see FIG. 11). Compression is negative and tension positive. The cladding absorptivity is 7.5 cm$^{-1}$.

| Stress Orientation | Calculated Peak Stress (MPa) |
|---|---|
| Cladding | |
| Parallel stress | −21 |
| Perpendicular stress | 19 |
| Disk | |
| Parallel stress | 7.3 |
| Perpendicular stress | 7.0 |
| Interface | |
| Parallel stress | 7.5 |
| Perpendicular stress | 9.5 |

However, there are several conditions that could either increase the stresses or reduce the overall strength of the bond. For example:

Small delaminations of the bond near the disk surface can lead to the onset of parasitic oscillations producing significantly higher temperatures and stresses.

Bond imperfection can produce stress concentration.

The bond may fatigue after several thousand cycles.

Variability of the glass surface chemistry (e.g. by weathering) may reduce the bond strength.

During cladding testing it is determined that each of the above mechanisms could have been responsible for some of the observed bond failures. To increase the margin-of-safety against bond failure, we investigated ways to both reduce the thermal stresses and increase the bond strength.

10. Reducing Thermal Stresses

For a fixed disk geometry, the maximum stress at the cladding interface varies linearly with the temperature difference or, from eq. (7) above, with the cladding absorptivity. Therefore, reducing the cladding absorptivity by 50% will produce a corresponding 50% drop in the maximum stress. In most applications reducing the cladding absorptivity is not a problem because the cladding thickness (t) can be increased to give the doping-thickness product ($\beta \cdot t$) required for parasitic suppression. In the Nova application we are replacing disks on an already-built system. Thus we are constrained to the original amplifier dimensions and beam aperture and, accordingly, the cladding cannot be made thicker than the original 0.6 cm.

The original Nova disks used a cladding with a nominal doping thickness product of 4.5 (i.e. 0.6 cm·7.5 cm$^{-1}$), and we initially used a cladding having the same value. However, calculations have shown that for the same thickness the cladding absorptivity could be as low as 3.0 cm$^{-1}$ without affecting the amplifier performance.

Amplifier gain tests have been carried out on prototype disks with 0.6 cm thick claddings doped at 7.5, 4.5 and 3.0 cm$^{-1}$. The results showed no appreciable loss in gain at lower cladding dopings. As a result, a cladding doping of 4.5 cm$^{-1}$ is chosen for the NOVA disk application. This reduces the thermal stresses on the interface by 40% without any sacrifice in system performance.

11. Improving Bond Strength

The strength of adhesion of an organic polymer to an inorganic substrate depends on the sum of the forces acting across the interfacial boundary. See for example, D. H. Kaelbe, *Physical Chemistry of Adhesion*. Wiley Interscience, New York, N.Y., 1971, pp. 139-189; F. M. Fowkes, "Attractive Forces at Interfaces", in *Chemistry and Physics of Interfaces*, American Chemical Society, Washington, D.C., D. E. Gushee, Ed., 1965, pp. 1-12; and F. M. Fowkes, "Role of Acid-Based Interfacial Bonding in Adhesion", J. Adhes. Sci. and Tech. 1, 7 (1987). In general, these forces can be broken into two parts: one associated with the long-range London dispersive forces and the other due to acid-base interactions (in the Lewis sense) between the two materials. This observation is generally expressed in terms of the thermodynamic "work-of-adhesion", $W_a$, the work needed to separate the two phases - i.e. the adhesive bond):

$$W_a = W_d + W_{a:b} \tag{8}$$

where $W_d$ and $W_{a:b}$ are work-of-adhesion contributions due to dispersion forces and acid-base interactions, respectively.

To increase $W_d$ would require increasing the magnitude of the dispersion forces acting across the interface. For this application this is not practical since it would require changing either the polymer or the substrate or both. On the other hand, it is possible to change the character of the glass surface to enhance the acid-base interaction.

The epoxy used to bond the cladding to the glass is an amine cured system (Table 2) and is considered a Lewis base. The phosphate laser glass on the other hand is also normally a basic surface due to the migration of alkali and alkaline-earth ions to the glass surface. These ions can also readily react with water vapor and $CO_2$ in the air producing the corresponding basic hydroxide, carbonate and bicarbonate weathering products. By treating the glass surface with a dilute acid it is possible to remove the weathering products and temporarily replace the metal ions with protons (acidic sites). If bonding proceeds shortly after the acid treatment, then the amine can form acid-base bonds with the glass surface and increase the adhesive strength of the bond.

It was found that if the surface of the phosphate glass (used to make the laser disks and cladding) is acid treated, it significantly improves the epoxy adhesive strength (FIG. 11). The relative strength improvement was determined using a standard peel-test, see J. J. Bikerman, *The Science of Adhesive Joints*. Academic Press, New York, N.Y., 1968, 2nd Edition, pp. 242-258, that measures the force required to peel the polymer off the glass surface. The test is carried out by using an Instron tensile-testing machine and is well known in this art.

A concentrated acid treatment produces no noticeable improvement in strength over that obtained with a dilute acid. Thus, the dilute acid treatment is adopted in our cladding process, 0.2N acetic acid is preferred.

Figure 15:
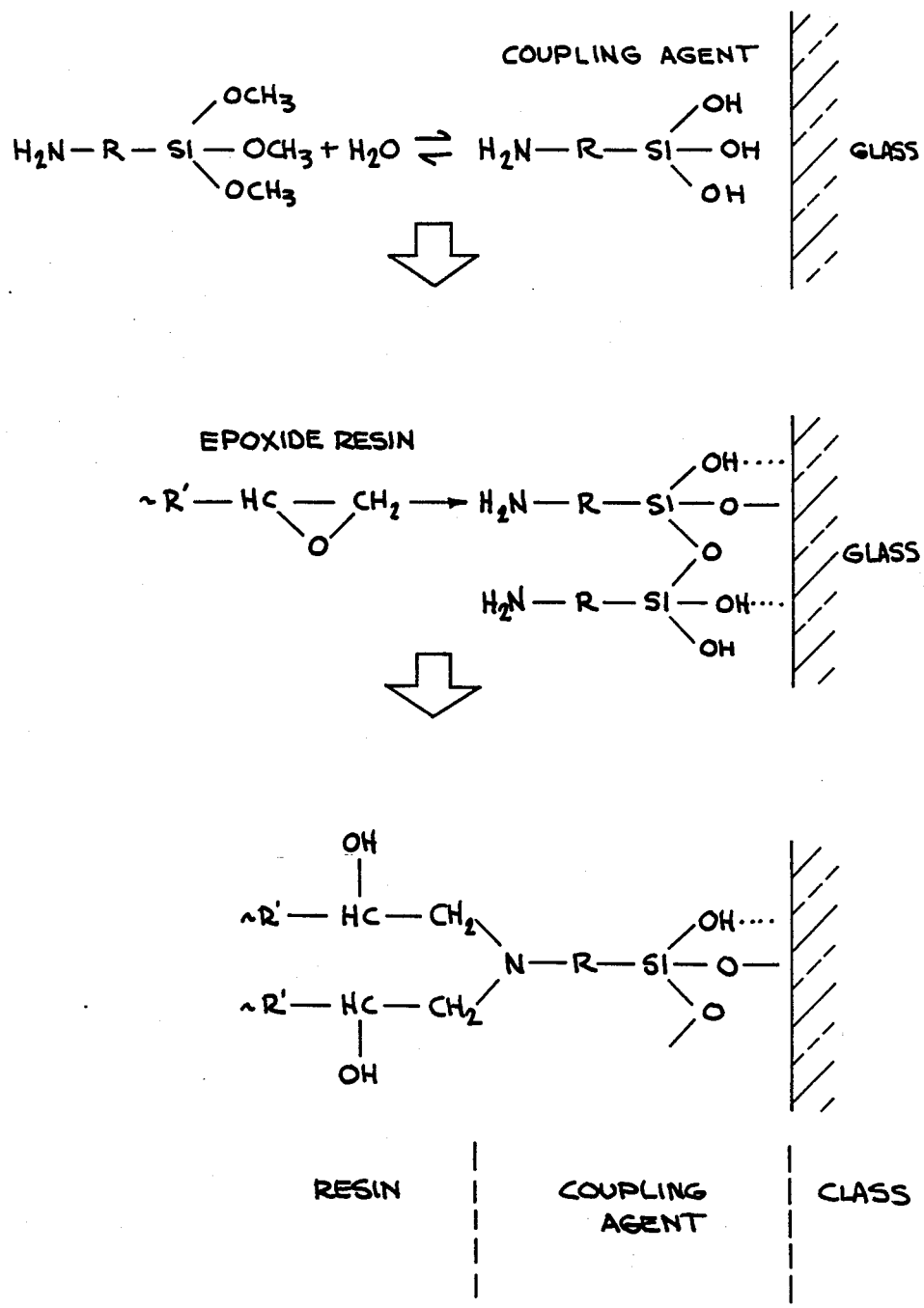
FIG. 15 shows the structure and reaction of a silane coupling agent.

A second method used to increase the bond strength is the application of a silane coupling agent to the glass surface. A silane coupling agent consists of an organofunctional group attached to an easily hydrolyzable alkoxysilane (FIG. 5), see E. P. Pluddemann, *Silane Coupling Agents*. Plenum Press, New York, N.Y., 1982, which is incorporated herein by reference. In principle it works by bonding the siloxane portion of the molecule to the inorganic substrate and the organic portion to the polymer. The coupling agent is of the class of organosilanes, organotitanates, organozirconates, and organozircoaluminates. Organosilanes are preferred. It is dissolved in an organic solvent and then hydrolyzed in water under either acidic or basic conditions. In our case we use a slightly acidic solution (pH=4). The resulting silanol groups are believed to couple to the glass surface by either hydrogen-bonding (an acid-base interaction) or by direct formation of oxane bonds with the glass surface (in this case Si—O—P, see FIG. 15).

The coupling agent chosen also has a diamine functional group that reacts with the epoxide rings in the adhesive. The reaction between the amine and epoxide is generically the same as outlined in FIG. 9. Note that in this case the coupling agent makes the glass surface basic (covered with amine groups) whereas the epoxide in the polymer acts as the Lewis acid. Therefore the application of a coupling agent can still be thought of as increasing the acid-base contribution to the work of adhesion.

Figure 14:
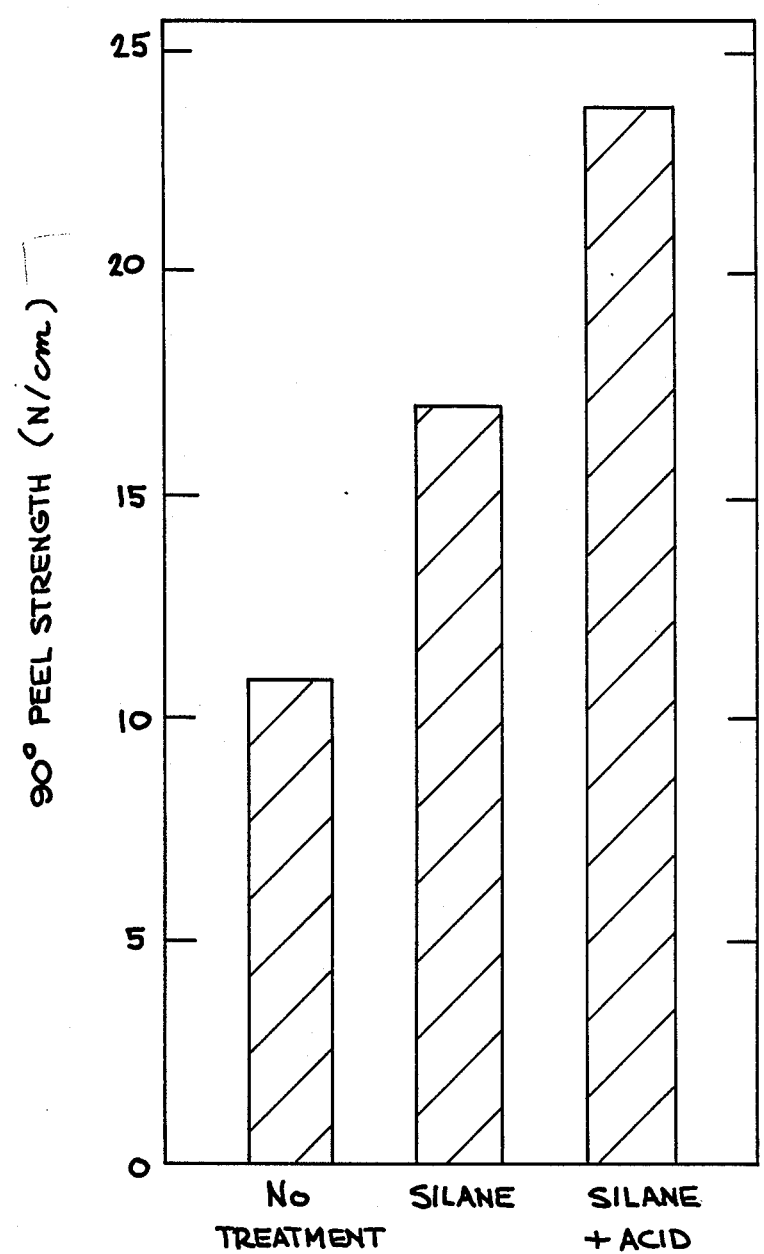
FIG. 14 shows the effect of acid surface treatment and silane coupling agent on adhesive strength as measured by a standard 90° peel test.

FIG. 14 shows the relative improvement in bond strength due to the application of the coupling agent. It is found that the use of an acid surface treatment followed by application of a silane coupling agent produces the highest bond strengths.

12. Testing Organic Material Bonded Clad Laser Disks

Back-to-back gain tests in a 46-cm amplifier were used to demonstrate that the epoxy-bonded cladding gives the same performance as fused-glass claddings. These tests were carried out in the same amplifier using the nominal Nova phosphate laser glass (LG-750 and LHG-8) doped with $2 \times 10^{20}$ Nd-ions/cm$^3$. The disks themselves had slightly different spontaneous emission lifetimes which were accounted for in making the performance comparison.

Figure 16:
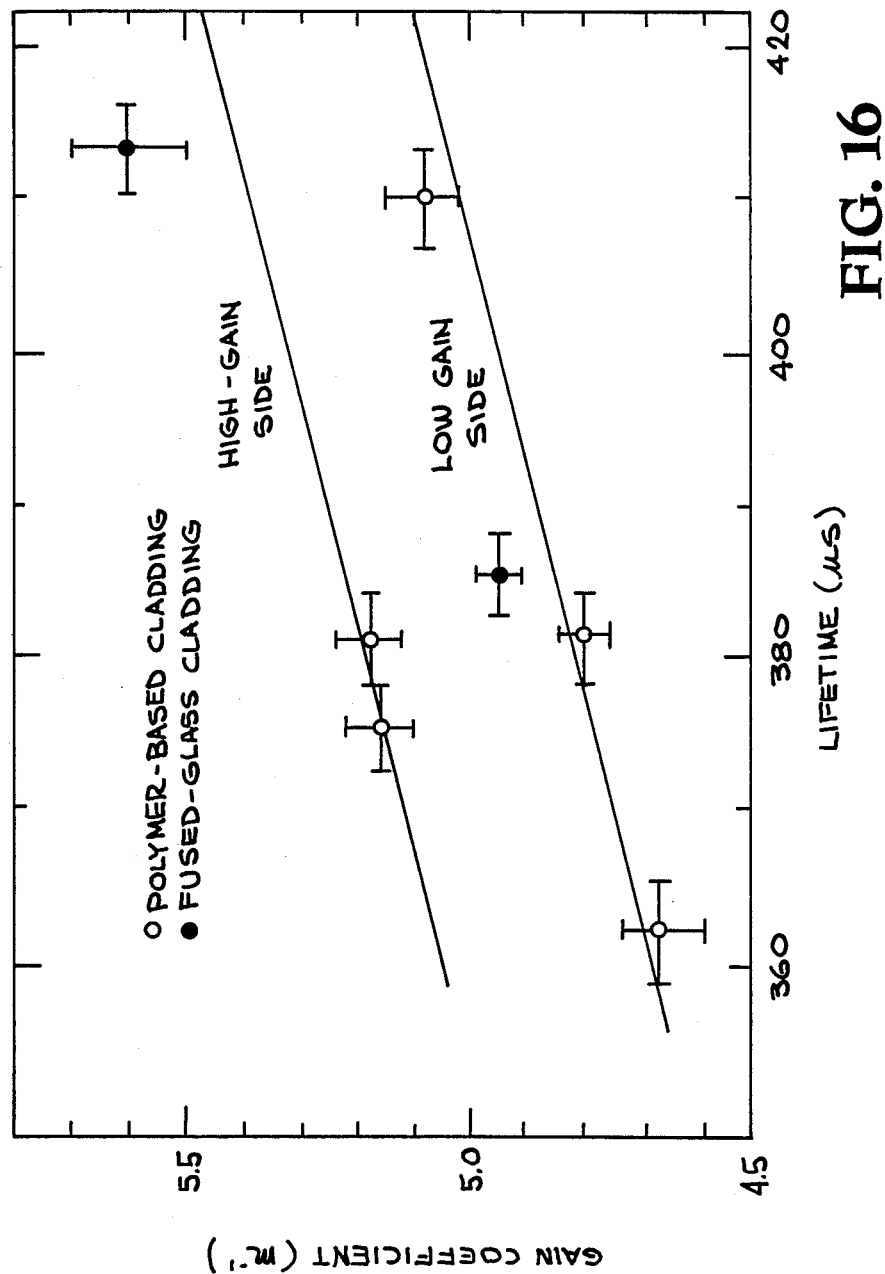
FIG. 16 is a graph of the gain performance comparison of epoxy-bonded and fused glass edge claddings on 2 wt % Nd-doped 46-cm amplifier edge tilts (angles cut from the perpendicular).

FIG. 16 shows the gain coefficients measured at the nominal Nova flashlamp operating voltage (20 kV) for five disks with epoxy bonded cladding and two disks with fused glass claddings. The data are plotted versus the measured spontaneous emission lifetimes for the disks.

Three of the disks were tested on the so-called "high-gain side" of the amplifier and the other four on the "low-gain side", thus the data in FIG. 16 are plotted in two subsets. The small difference in gain from one side of the amplifier to the other is a result of pumping differences in the 46-cm amplifier. See 1983 *Laser Program Annual Report*, Lawrence Livermore National Laboratory, Livermore, Calif., UCRL-50021-83 (1984), pp. 6-2 to 6-8. The lines through the two data subsets are based on model calculations and show the expected slope the data should follow.

The results show that after accounting for the fluorescence-lifetime differences between the disks, the gain performance is about 3% higher in the fused glass cladding design. This remaining performance difference can be accounted for by the small area difference between the two types of disks. The polygonal-shaped disks with the polymer edge cladding exposes slightly more area to the flashlamp light than the original elliptical disks used with the fused-glass cladding. The additional disk area cannot be used by the Nova beam but it absorbs flashlamp light that might otherwise pump the useful aperture of the disk. After correcting for this area difference the gains for the two cladding types agree to better than 1% which is within the combined experimental error. It is concluded that the gain performance achieved using the epoxy-bonded cladding is as good as that with fused-glass.

It should be added that in the final amplifier assemblies used on Nova the unused area of the polygonal disk is masked to avoid the pumping losses mentioned above.

13. Effect of Tilting Disk Edges

During the final disk fabrication, it is expected that most but not all the small defects will be removed at the cladding interface. Consequently, the disk edges are tilted to protect against the onset of parasitic oscillations.

Figure 17:
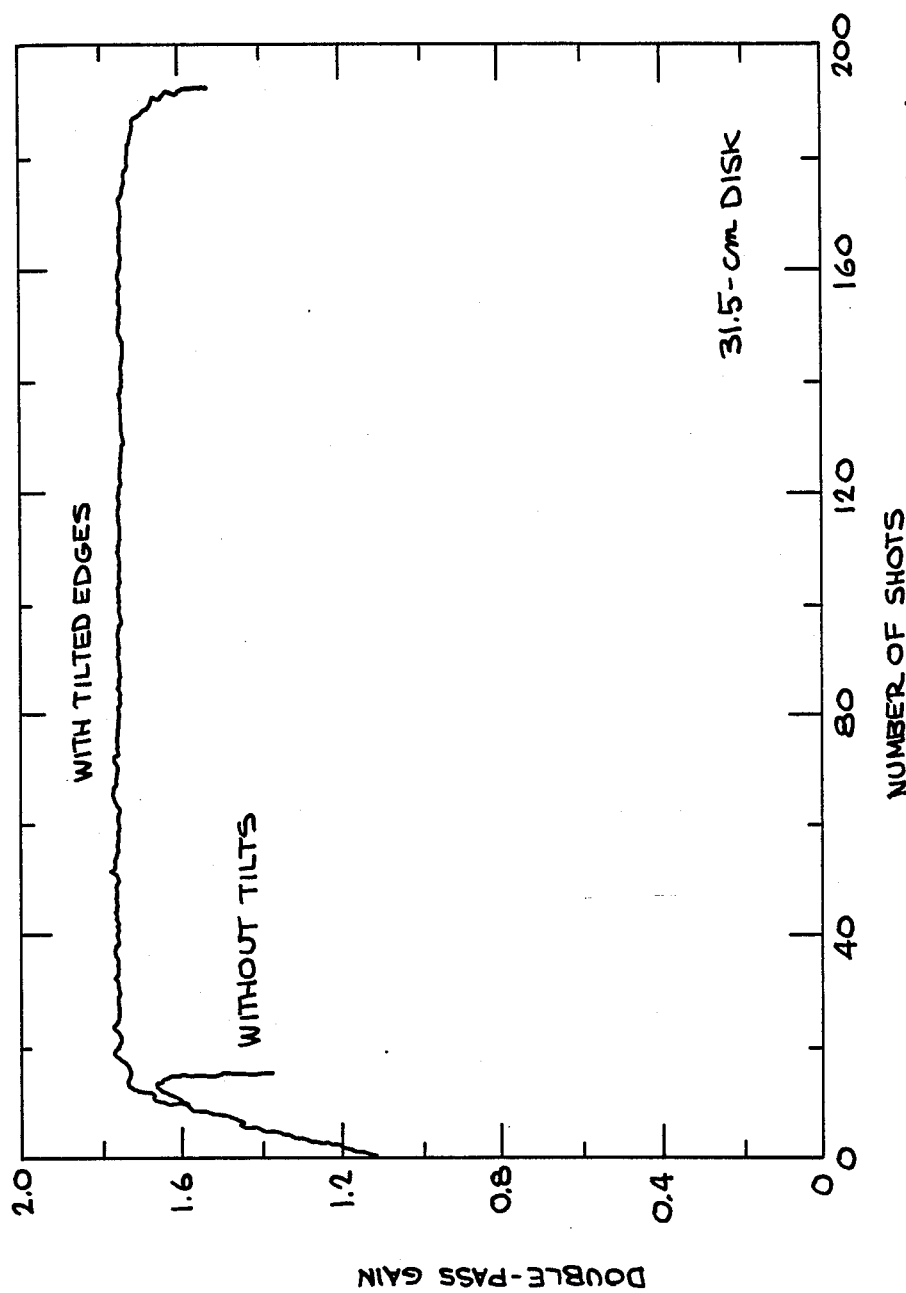
FIG. 17 is a graph of gain vs. number of amplifier shots for two identically clad 2 wt % Nd-doped, 31.5-cm disks with and without edge tilts.

The amplifier test results in FIG. 17 show the dramatic effect small angular tilts have on protecting against parasitic oscillations and extending the operating life of the disk. Two Nd-doped ($2 \times 10^{20}$- ions. cm$^3$), 31.5-cm disks with 7.5 cm$^{-1}$ absorption cladding were individually tested in the same amplifier. The cladding on both disks had roughly the same number and distribution of flaws produced during fabrication. However, in one case the disk had edges perpendicular to the faces whereas in the other case the edges at the long end of the disk were tilted by 0.8. The disk without tilts failed during the first few shots as the gain was being increased to the nominal Nova operating conditions. The disk with the tilted edges, however, lasted for 174 shots before the gain began to rapidly fall off after the onset of parasitic oscillations. The parasitic oscillations occurred across the short dimension (i.e width) of the disk between edges that were not tilted.

14. 2000-shot Lifetime Test

Before proceeding with the final production of the epoxy-bonded cladding a 2000-shot lifetime test was carried out on a prototype 31.5-cm disk, i.e., 2000-Shots corresponds to about 4 to 5 years of Nova operation. The disk survived the 2000 shots without any visible degradation or change in gain.

The prototype disk used 6 mm thick edge cladding with an absorption of 4.5 cm$^{-1}$. The disk tilts were 0.8° and the cladding and disk bonding surfaces were treated with the silane coupling agent as is discussed in the previous section.

Since this test we have adopted a slightly larger tilt angle (0.5° to 2° preferably 1.4°) and used the dilute acid surface treatment prior to adding the silane coupling agent. Both of these measures are designed to enhance the operating margin of safety for the final Nova disks.

15. The Cladding Process

The process of cladding the laser disks is separated into four major steps:
(1) laser disk and cladding glass preparation,
(2) glass surface treatment,
(3) adhesive bonding and cure, and
(4) cladding finishing.

These steps are shown schematically in FIGS. 18A and 18B, and discussed in further detail below.

Chemicals are used as provided by Aldrich Chemical Company, Milwaukee, Wis., or from sources in *Chemical Source*, published by Directories Publications, Inc. of Columbia, S.C.

STEP 1:

The laser disks 70, as received from the glass companies, are shaped, peripheral edge 72 polished, cleaned and inspected for foreign particles (face is 73). In a similar fashion, the cladding glass strips 71 are cut to size and then polished 74 on one side and ground on the other 75. The polished side of the cladding later serves as the bonding surface while the ground side provides a diffuse reflecting surface for any ASE that is not absorbed on the first-pass through the cladding.

Figure 18A:
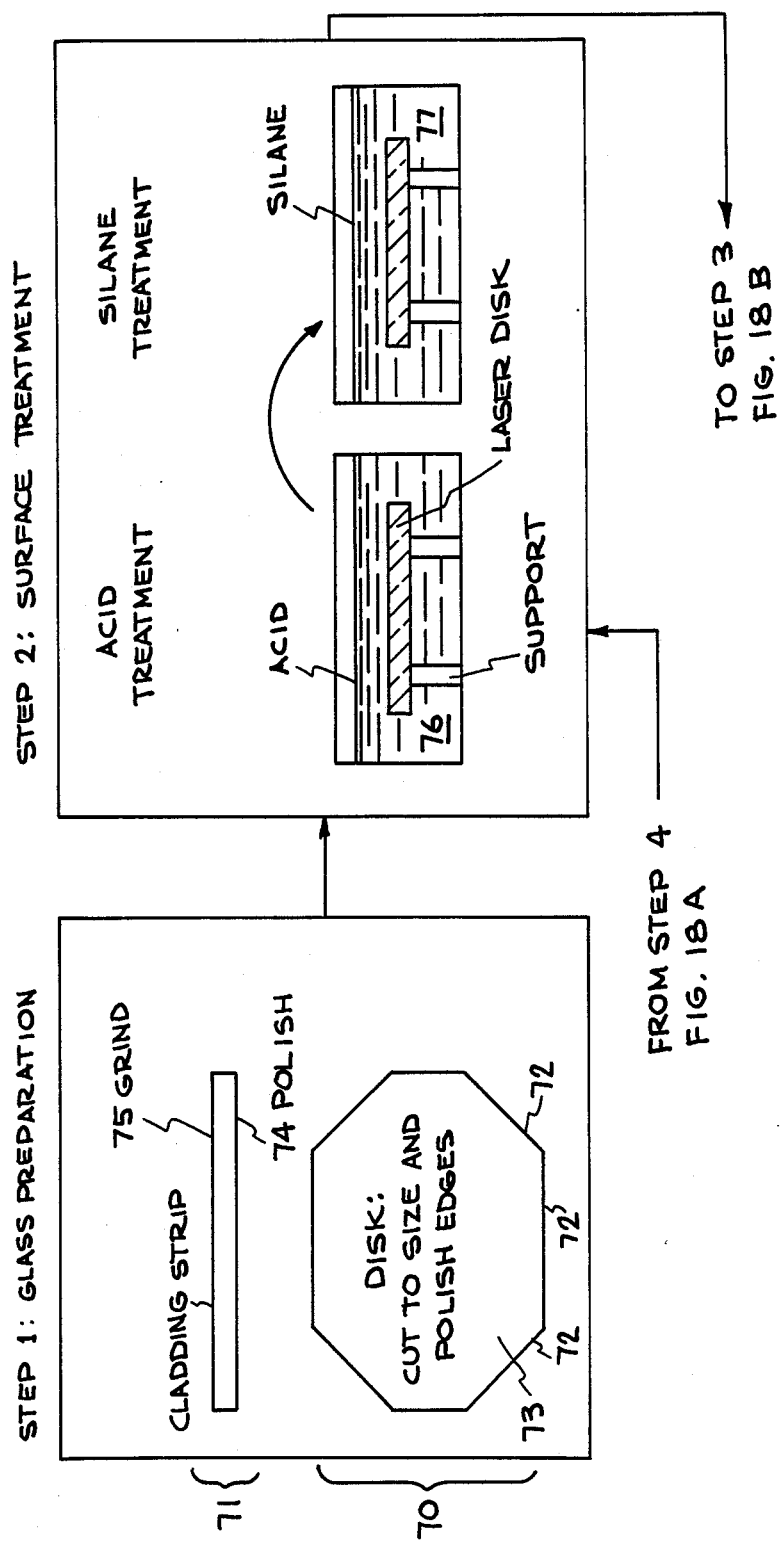
FIGS. 18A and 18B are schematic diagrams of the two-step cladding process.
Figure 18B:
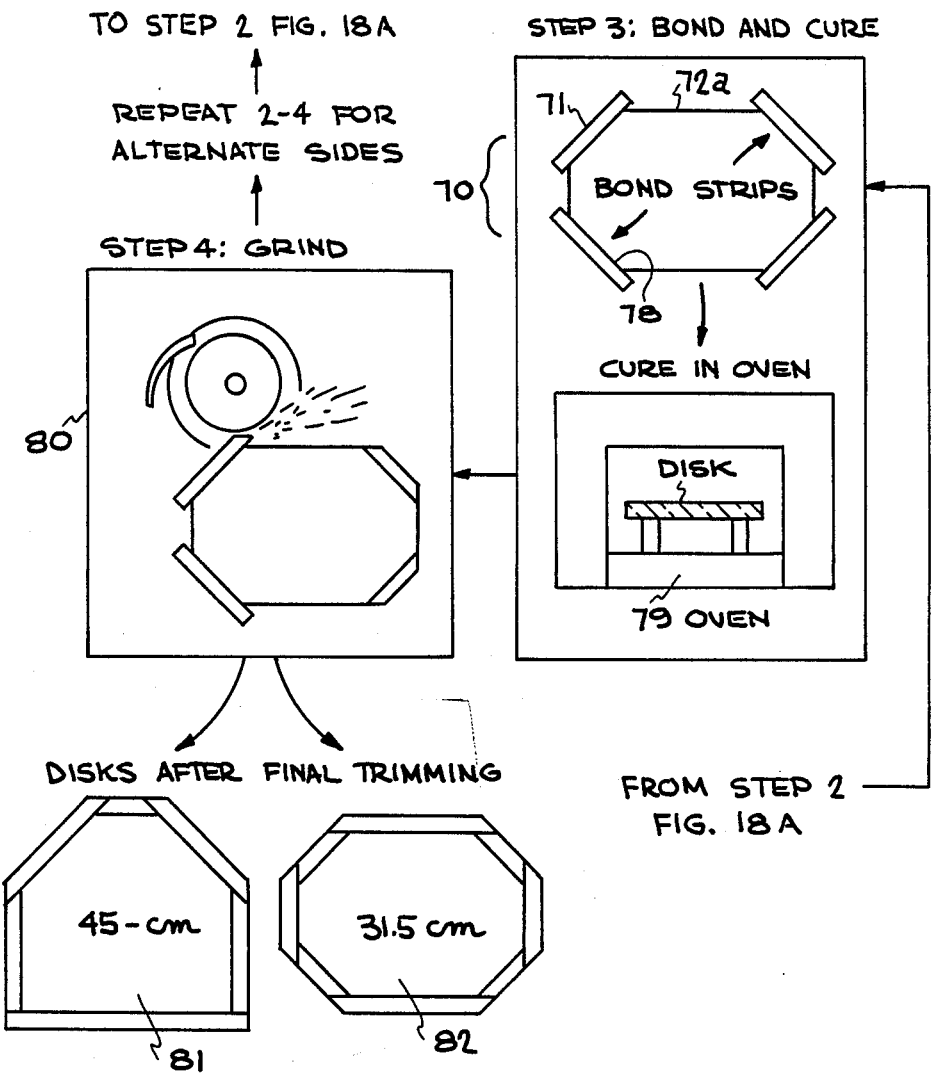

STEP 2:

The bonding surfaces of both the cladding and laser disks are treated with a dilute acid 76 for cleaning followed by application of the silane coupling agent (FIGS. 18A and 18B). In the acid treatment, a 0.2N solution of acetic acid is used to remove weathering products and acidify the glass surface; this is accomplished by simply submerging the disk into the acid bath 75 for about 20 minutes. After removal, the disk is immediately transferred to a class-100, horizontal-flow clean room for application of the silane coupling agent and the subsequent bonding operations.

The silane coupling agent 77 is also applied by submerging the disk in a tank. The solution consists of a mixture of 1% a silane coupling agent, such as (3-[aminoethylamino]-propyltrimethoxysilane; Z6020 made by Dow Corning Corporation) in 20% methanol and 79% distilled water. The pH of the coupling agent solution is adjusted to a value of about 4 using acetic acid. Again the disk is submerged for a few minutes, removed and thoroughly flushed with distilled water, then methanol and finally air dried. The disks are temporarily stored in a dry environment until proceeding to the bonding operation.

STEP 3:

During bonding the disk 70 is placed in a bonding fixture that is used to hold the disk and cladding strips in place. The adhesive reactants are filtered, mixed in the proper stoichiometric quantities and applied to the polished surface of the cladding glass. Each cladding strip is slowly pressed into place taking care to eliminate all bubbles (bonding agent 78). Once in place, it is lightly clamped with a pressure of about a few pounds per inch$^2$ to give the proper bond-line thickness of 25 $\mu$m.

The disk remains in the bonding fixture for 24 hours at about 25° C. This is the time it takes the epoxy 78 to set. The epoxy is then cured by heating at about 3° C./hr up to about 80° C., holding at about 80° C. for about 4 hours and then cooling the disk at about 3° C./hr back to ambient. Preferably, these conditions are used. The slow heating rates are designed to minimize any thermal gradients and subsequent stresses in the disk. The temperature across the oven 79 is uniform to within 1° C. for the same reason.

The actual bonding process is better accomplished in two phases. In phase-one cladding strips are applied to half the edges in an alternating pattern (see step 3, top). The whole disk is then cured and machined 80 to remove the excess length (FIGS. 18A and 18B). In phase two the process of steps 1, 2 and 3 is repeated for the other open peripheral edges 72A. During the second phase the preferred treatment is to omit the dipping in acid and proceeding directly to treatment with the coupling agent, e.g. silane.

In this sequence, the longest strips remain unconstrained during the heating cycle. This minimizes potential problems due to thermal expansion differences between the disk glass and edge cladding.

STEP 4:

Finally after all the cladding has been applied, the disk faces 81 and 82 are ground and polished to the required $\lambda/8$ wave-front quality by methods known in this art.

While the present invention has been described with reference to the specific embodiments thereof, it should be understood by those skilled in the art of cladding a glass laser disk with a refractive index matched claddening material (e.g. glass, polymer and/or dye) to suppress amplified spontaneous emissions in laser applications is such that various changes may be made and equivalents may be substituted without departing from the true spirit and scope of the present invention. In addition, many modifications may be made to adapt a particular situation, material, or composition of matter, process, process step or steps, or the present objective to the spirit and scope of this invention, without departing from its essential teachings.

We claim:

1. A method for suppressing parasitic oscillations in a solid state laser component by producing an article having an integral solid state laser gain media which has bonded to its peripheral edge using a bonding agent a laser light absorbing material, the method comprising;
   (a) placing a thin layer of bonding agent selected from the group consisting of inorganic adhesives, cements, organic adhesives, organic polymers and polymerizable monomers, the bonding agent having a refractive index closely matching the solid state laser gain media and the laser light absorbing material, covering the entire outer surface of the peripheral edge of the solid state laser gain media,
   (b) using the bonding agent to bond a laser light absorbing material layer in close proximity and covering the entire outer surface of the peripheral edge of the solid state laser gain media, with the proviso that the bonding agent is not silicone rubber.

2. The method of claim 1 wherein the bonding agent or precursors to the bonding agent react to produce the bonding agent without the simultaneous production of volatile chemicals.

3. The method of claim 2 wherein the refractive index of the reacted bonding agent has a refractive index range of between about 1.3 and 1.7 at the laser wavelength in the visible or near IR regions of the spectrum between about 0.4 and 1.5 micrometers.

4. The method of claim 2 wherein the refractive index match required depends upon the size and gain coefficient of the laser material, for large components the refractive index match is between about $+$ or $-0.003$ of the refractive index of the solid state laser gain media.

5. The method of claim 1 where the thermal coefficient of expansion of the solid state of laser gain media and the laser light absorbing material match between about $+$ or $-5\%$.

6. The method of claim 1 wherein the laser light absorbing material has the minimum required absorption coefficient at the laser light wavelength to minimize thermal stress on the junction formed by the solid state laser gain media, bonding agent and laser light absorbing material.

7. The method of claim 2 wherein the thickness of the bonding agent after curing between the solid state laser material and the laser light absorbing material is between about 1 micron and 2 millimeters.

8. The method of claim 7 therein the thickness of the organic material is between 1 and 50 microns.

9. The method of claim 8 wherein the thickness is about 25 microns.

10. The method of claim 1 wherein the solid state laser gain media comprises inorganic glass, ceramics, crystals, phosphate, fluorophosphate, silica glass or laminates of these materials.

11. The method of claim 10 wherein the solid state laser gain media comprises inorganic glasses selected from silica, phosphate or fluorophosphate glasses.

12. The method of claim 1 wherein the laser light absorbing material comprises inorganic glasses, crystals, ceramics, or laminates of these materials.

13. The method of claim 12 wherein the laser light absorbing material comprises inorganic glasses selected from silica, phosphate or fluorophosphate glasses.

14. The method of claim 10 wherein the solid state laser gain media and the laser light absorbing material each comprise the same materials, having essentially a matching coefficient of thermal expansion and essentially a matching refractive index.

15. The method of claim 14 wherein the solid state laser gain material is phosphate glass doped with an active ion at a concentration up to about $10^{21}$ ions per $cm^3$.

16. The method of claim 13 wherein the laser light absorbing material is doped with active metal ions, at a concentration of up to 20 percent by weight.

17. The method of claim 1 wherein the method further includes:
   Step (c) prior treating the surfaces to be bonded with dilute acid to etch and clean the surface.

18. The method of claim 17 wherein the method further includes:
   Step (d) prior treating the surfaces to be bonded with a primer or a coupling agent.

19. The method of claim 15 wherein the active ion is neodymium.

20. The method of claim 13 wherein the laser light absorbing material comprises phosphate glass.

21. The method of claim 16 wherein the laser light absorbing material is doped with metal ions, up to a concentration of about 1 percent by weight.

22. The method of claim 21 wherein the metal ion is copper.

23. The method of claim 2 wherein the bonding agent comprises an adhesive selected from epoxy materials, epoxy precursors, urethane acrylics or rigid silicones.

24. The method of claim 23 wherein the epoxy precursors comprise an epoxide and an organic amine.

25. The method of claim 24 wherein the organic epoxide comprises an epoxide selected from the diglycidal ether of bis-phenol-A, the diglycidal ether of 1,4-butanediol or mixtures thereof.

26. The method of claim 25 wherein the diglycidal ether is crosslinked using an amine crosslinking agent selected from a polyether triamine in the presence of an amine accelerator.

27. The method of claim 1 wherein the face of the article is ground and polished after the peripheral edge bonding to obtain an uncontaminated optical surface with a minimum of thickness of bonding agent between the solid state laser gain media and the laser light absorbing material 28. The method of claim 27 wherein the article is produced in a two-step manner, itself comprising:
(i) bonding discrete pieces of laser light absorbing material using a bonding agent to attach to alternating peripheral edges of the solid state laser gain media wherein open spaces remain on the peripheral edge of the solid state laser gain media,
(ii) grinding and polishing the ends of the bonded laser light absorbing material and the intervening peripheral edges of the solid state gain media to produce a continuous, flat and uncontaminated surface,
(iii) bonding additional pieces of laser light absorbing material in the remaining open spaces on alternating sides of the peripheral edge of the solid state laser gain media using a bonding agent thereby producing a completely continuous cladding of laser light absorbing material on the peripheral edge of the solid state laser gain media, and
(iv) trimming the edge by grinding and polishing the ends of the bonded laser light absorbing material to be flush with the adjoining material, and
(v) grinding and polishing the face surface created by the bonding of the solid state laser gain media, bonding agent and laser light absorbing material to produce an optically smooth face surface.

29. The article having an integral solid state laser gain media which has bonded to its peripheral edge, using a bonding agent, a light absorbing material produced according to the method of claim 1.

30. The article having an integral solid state laser gain media which has bonded to its peripheral edge, using a bonding agent, a light absorbing material produced according to the method of claim 14.

31. The article having an integral solid state laser gain media which has bonded to its peripheral edge, using a bonding agent, a light absorbing material produced according to the method of claim 28.

32. The article of claim 29 wherein the peripheral edge of the solid state laser gain media is cut wherein the peripheral edge has an angle of between about 0.1 and 5 degrees from the perpendicular with respect to the face surface.

33. The article according to claim 29 wherein the bonding by the bonding agent between the solid state laser gain media and the laser light absorption material is stable in operation without voids or delaminations for more than 2000 operating cycles.

34. A method for suppressing parasitic oscillations in solid state laser gain media, the method comprising:
(a) dissolving a dye, or dispersing a pigment, or adding a particulate material which absorbs light at a wavelength matching that of the light generated by the laser material in an organic material selected from the group consisting or organic polymers and polymerizable monomers, the proviso that the organic material is not an organic soft silicone rubber, and
(b) bonding the organic material mixed with the dye or pigment on the peripheral edges of the solid state laser gain medium.

35. The method of claim 34 in which the aggregate dissolved dyes or dispersed pigments are in concentration up to about 10 percent by weight.

36. The method of claim 34 wherein the concentration is between about 0.01 and 0.02 percent by weight.

37. The method of claim 34 wherein the dyes or pigments are selected from:
organometallic complexes, 10 micron to 1 millimeter sized glass beads, micron sized pigments, or micron sized broad band wavelength absorbers.

38. The method of claim 37 in which the dyes or pigments are typically chosen from the group consisting of:
(i) bis(4-dimethylaminodithiobenzyl)-nickel,
(ii) an antimony containing organic compound of the formula: $N_4C_{30}H_{42}.SbF_6$, and
(iii) sub-micron sized carbon black particles or a similar broadband wavelength absorber.

39. The method of claim 34 wherein the organic polymer is selected from rigid silicone compounds, epoxies, polyamides, acrylics, polyphosphazenes or urethane-acrylates.

40. The method of claim 34 wherein:
the solid state laser gain media is phosphate glass;
the dye or pigment is selected from bis (4-dimethylaminodithiobenzyl) - nickel, an antimony containing organic compound, 10 micron to 1 millimeter sized glass beads containing an absorber, or submicronsized carbon particles, and
the organic material is selected from an organic polymer selected from rigid silicone compounds, epoxies, free radical polymerized polyesters, acrylics, polyurethanes, polyphosphazenes, polyurethane-acrylics, poly(styrene) or poly(vinylbutyryl).

41. The article produced by the method of claim 34.

42. The article produced by the method of claim 40.

43. The article produced by the method of claim 34 wherein the peripheral edge of the solid state laser gain media is between about 0.1 and 5 degrees from the perpendicular with respect to the face surfaces.

44. The method of claim 43 wherein:
the solid state laser gain material is phosphate glass doped with neodymium,
the organic material is an epoxy-based adhesive, and
the dye or pigment is selected from bis (4-dimethylaminodithionyl)-nickel (Kodak Q-Switch), an antimony containing organic compound (Cyasorb IR-99); 10 micron to 1 millimeter sized glass beads, or submicron sized carbon particles.

45. A method for suppressing parasitic oscillations in a solid state laser component by producing an article having an integral solid state laser gain media which has bonded to its peripheral edge using a bonding agent a laser light absorbing material, the method comprising;

(a) placing a thin layer of a bonding agent comprising an epoxy based adhesive having a refractive index essentially matching the solid state laser gain media which is comprised of a Pt-incursion free phosphate glass doped with neodymium and also the laser light absorbing material which is comprised of a Pt-incursion free phosphate glass doped with copper covering the entire outer surface of the peripheral edge of the solid sate laser gain media, (b) using the bonding agent to bond a laser light absorbing material layer in close proximity and covering the entire outer surface of the peripheral edge of the solid state laser gain media wherein the article is produced in a two-step manner, itself comprising:

(i) bonding discrete pieces of the laser light absorbing material using an epoxy adhesive to attach to alternating peripheral edges of the solid state laser gain media wherein open spaces remain on the peripheral edge of the solid state laser gain media, (ii) grinding and polishing the ends of the bonded laser light absorbing material and the intervening peripheral edges of the solid state gain media to produce a continuous, flat, and uncontaminated surface, (iii) bonding additional pieces of laser light absorbing material in the remaining open spaces on alternating sides of peripheral edge of the solid state laser gain media using a bonding agent thereby producing a completely continuous cladding of laser light absorbing material on the peripheral edge of the solid state laser gain media, and (iv) trimming the edge by grinding and polishing the ends of the bonded laser light absorbing material to be flush with the adjoining material, and (v) grinding and polishing the face surface created by the bonding of the solid state laser gain media, bonding agent and laser light absorbing material to produce an optically smooth face surface.

* * * * *